United States Patent
Clingman

(10) Patent No.: US 12,284,421 B2
(45) Date of Patent: Apr. 22, 2025

(54) EVENT DRIVEN AUTO BOOKMARKING FOR SHARING

(71) Applicant: Sony Interactive Entertainment Inc., Tokyo (JP)

(72) Inventor: Dustin S. Clingman, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 38 days.

(21) Appl. No.: 18/320,951

(22) Filed: May 19, 2023

(65) Prior Publication Data

US 2024/0388766 A1 Nov. 21, 2024

(51) Int. Cl.
*A63F 13/52* (2014.01)
*G06V 10/44* (2022.01)
*G06V 10/764* (2022.01)
*G06V 20/40* (2022.01)
*H04N 21/472* (2011.01)

(52) U.S. Cl.
CPC ....... *H04N 21/47217* (2013.01); *A63F 13/52* (2014.09); *G06V 10/44* (2022.01); *G06V 10/764* (2022.01); *G06V 20/44* (2022.01)

(58) Field of Classification Search
CPC .. H04N 21/47217; A63F 13/52; G06V 10/44; G06V 10/764; G06V 20/44
See application file for complete search history.

(56) References Cited

U.S. PATENT DOCUMENTS

| | | | |
|---|---|---|---|
| 10,926,184 B2* | 2/2021 | Lucas | A63F 13/77 |
| 2013/0044992 A1* | 2/2013 | Boland | H04N 5/772 |
| | | | 386/E5.069 |
| 2021/0370183 A1* | 12/2021 | Dorn | A63F 13/79 |
| 2022/0032202 A1* | 2/2022 | Mattar | A63F 13/211 |

\* cited by examiner

*Primary Examiner* — Thai Q Tran
*Assistant Examiner* — Jose M Mesa
(74) *Attorney, Agent, or Firm* — Kilpatrick Townsend & Stockton LLP

(57) ABSTRACT

A method including generating telemetry data for a plurality of image frames that is generated for a game play of a video game. The method including storing at least a subset of the plurality of image frames in a buffer. The method including analyzing the telemetry data to identify an event occurring in the subset of the plurality of image frames, wherein the event is associated with one or more image frames. The method including generating a bookmark for an image frame in the one or more image frames of the event, wherein the bookmark includes information of the event, and wherein selection of the bookmark by a user initiates a replay of the one or more image frames of the event.

20 Claims, 11 Drawing Sheets

700

EVENT DRIVEN AUTO BOOKMARKING FOR SHARING

TECHNICAL FIELD

The present disclosure is related to gaming, and more specifically to analyzing telemetry data that is automatically captured of game play of a video game to identify events within the game play, and the automatic marking of at least one corresponding image frame for each of those events to enable replaying image frames of the event that are stored in a buffer.

BACKGROUND OF THE DISCLOSURE

Video games and/or gaming applications and their related industries (e.g., video gaming) are extremely popular and represent a large percentage of the worldwide entertainment market. Video games are played anywhere and at any time using various types of platforms, including gaming consoles, desktop or laptop computers, mobile phones, etc.

During live game play of a video game, a player may wish to review recently played portions the game play. For example, the player may want to replay a particularly important and/or exciting portion of the game play, such as when fighting a boss, or tackling a complicated task. If the player was unsatisfied with the game play, the player may wish to review the portion of the game play to learn how to better play the game, such as learning what is needed to beat the boss or to accomplish the task. If the player was satisfied with the game play, the player may wish to review the portion of the game play just to relive the experience, such as when beating the boss, or accomplishing the task. In another example, the player may have been given some important information to perform a quest, such as when a non-player character (NPC) provides details on capturing an object (e.g., weapon) with additional instructions to bring that object to a particular location. At some point during the live game play, the player may have forgotten portions of or all of the information, and may wish to revisit their recent game play to again obtain the information, such as learning details of the quest.

However, accessing a specific portion of recent game play while the player is playing a video game is difficult, and requires hacking an existing service to view the portion of the game play of interest. For instance, the player may have to specifically instruct the gaming system to create a file including portions of game play for purposes of sharing with other players. The player may have to exit the game play in order to create the sharing file. When the sharing file is completed, the player can then review the file and search for the portion of the game play of interest for viewing.

It is in this context that embodiments of the disclosure arise.

SUMMARY

Embodiments of the present disclosure relate to the automatic capture of telemetry data of a game play of a video game by a player, the analysis of the telemetry data to identify one or more events within the game play, and the automatic marking of at least one corresponding image frame for each of those events to enable replaying image frames of the event that are stored in a buffer.

In one embodiment, a method is disclosed. The method including generating telemetry data for a plurality of image frames that is generated for a game play of a video game. The method including storing at least a subset of the plurality of image frames in a buffer. The method including analyzing the telemetry data to identify an event occurring in the subset of the plurality of image frames, wherein the event is associated with one or more image frames. The method including generating a bookmark for an image frame in the one or more image frames of the event, wherein the bookmark includes information of the event, and wherein selection of the bookmark by a user initiates a replay of the one or more image frames of the event.

In another embodiment, a non-transitory computer-readable medium storing a computer program for implementing a method is disclosed. The computer-readable medium including program instructions for generating telemetry data for a plurality of image frames that is generated for a game play of a video game. The computer-readable medium including program instructions for storing at least a subset of the plurality of image frames in a buffer. The computer-readable medium including program instructions for analyzing the telemetry data to identify an event occurring in the subset of the plurality of image frames, wherein the event is associated with one or more image frames. The computer-readable medium including program instructions for generating a bookmark for an image frame in the one or more image frames of the event, wherein the bookmark includes information of the event, and wherein selection of the bookmark by a user initiates a replay of the one or more image frames of the event.

In still another embodiment, a computer system is disclosed, wherein the computer system includes a processor and memory coupled to the processor and having stored therein instructions that, if executed by the computer system, cause the computer system to execute a method. The method including generating telemetry data for a plurality of image frames that is generated for a game play of a video game. The method including storing at least a subset of the plurality of image frames in a buffer. The method including analyzing the telemetry data to identify an event occurring in the subset of the plurality of image frames, wherein the event is associated with one or more image frames. The method including generating a bookmark for an image frame in the one or more image frames of the event, wherein the bookmark includes information of the event, and wherein selection of the bookmark by a user initiates a replay of the one or more image frames of the event.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1:
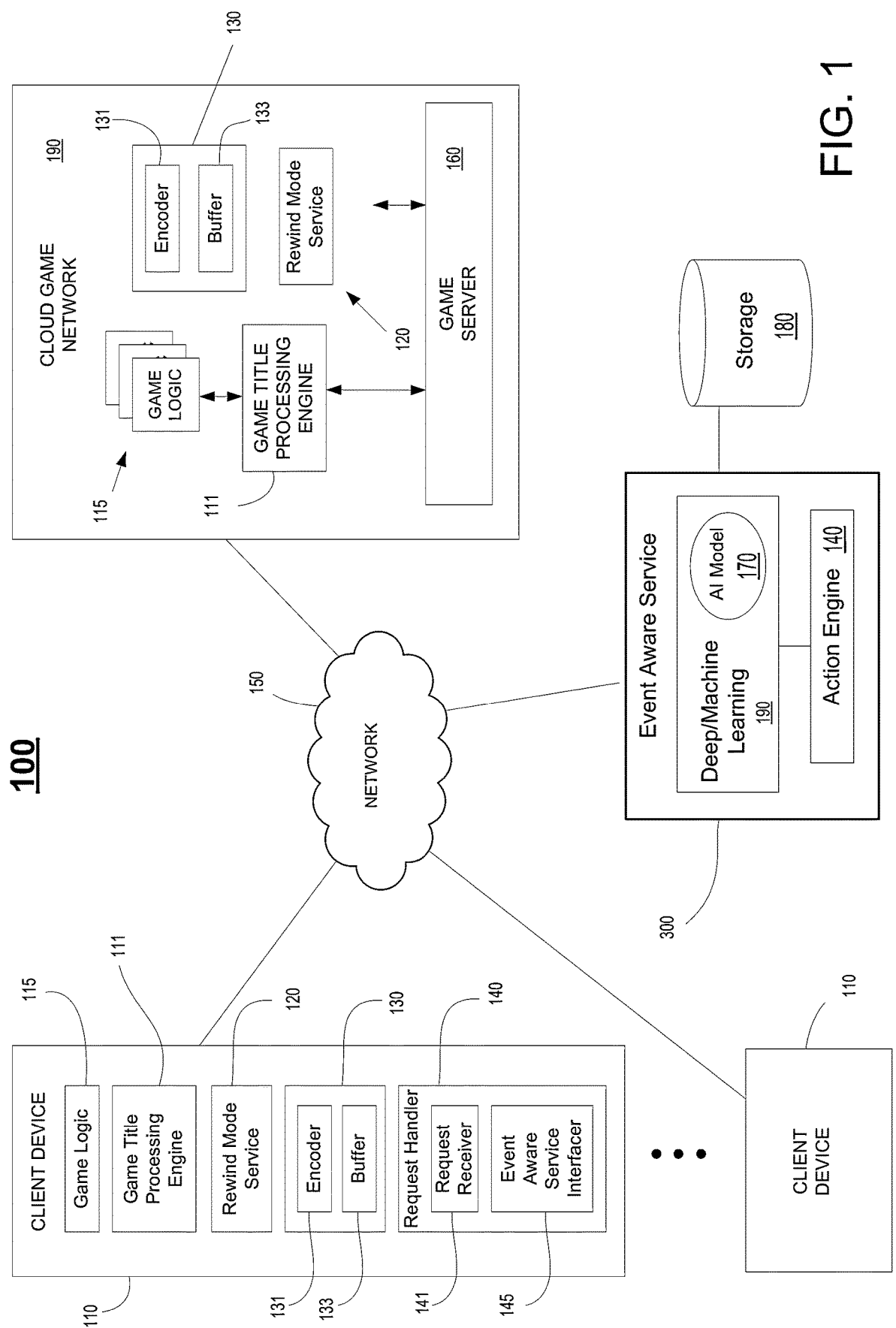
FIG. 1 illustrates a system including an event aware service providing for post-processing of telemetry data of game play of a video game that is automatically captured to identify and mark an event within the game play to enable replaying image frames of the event that are stored in a buffer, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods for capturing telemetry data (e.g., metadata) of game play of a video game to identify events that are occurring, such as events that may be important and/or significant and/or have some relevance to the player, and the automatic marking of those events (e.g., with tags and/or bookmarks) in corresponding video frames of the game play that are stored in a buffer (e.g., ring buffer) and without creating a file. In that manner, the tags and/or bookmarks are bound to the corresponding video frames for easy access by the user. The binding of the tags and/or bookmarks of events to the corresponding video frames provides a relationship of those events to other video frames in the ring buffer, as well as to the live game play. The tags and or bookmarks may be shown to the user in a user interface that is permanently displayed, or readily accessed to the user (e.g., via a preselected controller button). By selecting an auto generated bookmark, the user is able to jump to corresponding video frames, such as during a rewind mode of a game play, or when viewing a video that is created for sharing with others. In particular, because image frames of corresponding events are automatically bookmarked, the user is able to select a particular bookmarked image frame corresponding to a corresponding event from a list of bookmarks when entering the rewind mode in order to replay that event.

Advantages of the methods and systems configured to implement a system implemented rewind mode to revisit recent game play during live game play include a seamless experience in replaying events that occur within recent game play and that are automatically identified, wherein the recent game play is stored in a buffer. The replay of the event is implemented by accessing a rewind mode service, wherein the user is able to enter the rewind mode from live game play without accessing a stored file. Controller input enables intuitive control of the rewind mode, including pre-assigned buttons for rewinding, fast-rewinding, forwarding, fast-forwarding, pausing, playing, and returning back to live game play. Control of rewind mode may also be implemented through interaction with icons via a user interface. Entering rewind mode can be implemented via actuation of as little as one or two controller inputs. Auto-bookmarking of one or more events occurring during the game play enables the user to flip back-and-forth between live game play and an event. For example, while playing a quest of a video game, the user may periodically flip back to a bookmark to replay image frames that provide details of the quest (e.g., where to go, what to obtain, etc.) in case the user needs to know what next to do in the quest.

Throughout the specification, the reference to "game" or video game" or "gaming application" is meant to represent any type of interactive application that is directed through execution of input commands. For illustration purposes only, an interactive application includes applications for gaming, word processing, video processing, video game processing, etc. Also, the terms "virtual world" or "virtual environment" or "metaverse" is meant to represent any type of environment generated by a corresponding application or applications for interaction between a plurality of users in a multi-player session or multi-player gaming session. Further, the terms introduced above are interchangeable.

With the above general understanding of the various embodiments, example details of the embodiments will now be described with reference to the various drawings.

FIG. 1 illustrates a system 100 including an event aware service 300 providing for post-processing of telemetry data of game play of a video game that is automatically captured to identify and mark an event within the game play to enable replaying image frames of the event that are stored in a buffer, in accordance with one embodiment of the present disclosure. The event aware service 300 cooperates with a system implemented rewind mode service 120 to enable the replaying of an event that is marked occurring with recent game play that is stored in a buffer. In that manner, the user is able to enter a rewind mode from live game play to review an event and return to live game play afterwards. As such, the user is able to quickly review one or more events occurring within recent game play that is stored in a buffer, and without creating a file.

As shown, system 100 may provide gaming over a network 150 for and between one or more client devices 110. In particular, system 100 may be configured to provide gaming to users participating in a single-player or multi-player gaming session (e.g., participating in a video game in single-player mode, participating in a video game in multi-player mode, participating in a metaverse generated by an application with other players, etc.) via a cloud game network 190, wherein the game can be executed locally (e.g., on a local client device of a corresponding user) or can be executed remotely from a corresponding client device 110 (e.g., acting as a thin client) of a corresponding user that is playing the video game, in accordance with one embodiment of the present disclosure. In at least one capacity, the cloud game network 190 supports a multi-player gaming session for a group of users, to include delivering and receiving game data of players for purposes of coordinating and/or aligning objects and actions of players within a scene of a gaming world or metaverse, managing communications between user, etc. so that the users in distributed locations participating in a multi-player gaming session can interact with each other in the gaming world or metaverse in real-time.

In particular, system 100 may provide gaming control to one or more users playing one or more applications (e.g., video games) either through local instances operating on client devices or through cloud based instances operating in the cloud game network 190 via network 150 in the multi-player session. Network 150 may include one or more communication technologies, including 5th Generation (5G) network technology having advanced wireless communication systems (e.g., cellular network technology). In some embodiments, the cloud game network 190 may include a plurality of virtual machines (VMs) running on a hypervisor of a host machine, with one or more virtual machines configured to execute a game processor module utilizing the hardware resources available to the hypervisor of the host. It should be noted, that access services, such as providing access to games of the current embodiments, delivered over a wide geographical area often use cloud computing. Cloud computing is a style of computing in which dynamically scalable and often virtualized resources are provided as a service over the internet.

In a multi-player session allowing participation for a group of users to interact within a gaming world or metaverse generated by an application (which may be a video game), some users may be executing an instance of the application locally on a client device to participate in the multi-player session. Other users who do not have the application installed on a selected device or when the selected device is not computationally powerful enough to executing the application may be participating in the multi-player session via a cloud based instance of the application executing at the cloud game network 190.

As shown, the cloud game network 190 includes a game server 160 that provides access to a plurality of video games. Most applications played in a corresponding multi-player session are played over the network 150 with connection to the game server 160. For example, in a multi-player session involving multiple instances of an application (e.g., generating virtual environment, gaming world, metaverse, etc.), a dedicated server application (session manager) collects data from users and distributes it to other users so that all instances are updated as to objects, characters, etc. to allow for real-time interaction within the virtual environment of the multi-player session, wherein the users may be executing local instances or cloud based instances of the corresponding application. Game server 160 may be any type of server computing device available in the cloud, and may be configured as one or more virtual machines executing on one or more hosts. For example, game server 160 may manage a virtual machine supporting a game processor that instantiates a cloud based instance of an application for a user. As such, a plurality of game processors of game server 160 associated with a plurality of virtual machines is configured to execute multiple instances of one or more applications associated with gameplays of a plurality of users. In that manner, back-end server support provides streaming of media (e.g., video, audio, etc.) of gameplays of a plurality of applications (e.g., video games, gaming applications, etc.) to a plurality of corresponding users. That is, game server 160 is configured to stream data (e.g., rendered images and/or frames of a corresponding gameplay) back to a corresponding client device 110 through network 150. In that manner, a computationally complex gaming application may be executing at the back-end server in response to controller inputs received and forwarded by client device 110. Each server is able to render images and/or frames that are then encoded (e.g., compressed) and streamed to the corresponding client device for display. Game server 160 is also configured to stream video in support of the rewind mode to enable replaying of recent game play.

In the multi-player session, instances of an application may be executing locally on a client device 110 or at the cloud game network 190. In either case, the application as game logic 115 is executed by a game engine 111 (e.g., game title processing engine). For purposes of clarity and brevity, the implementation of game logic 115 and game engine 111 is described within the context of the cloud game network 190. In particular, the application may be executed by a distributed game title processing engine (referenced herein as "game engine"). In particular, game server 160 and/or the game title processing engine 111 includes basic processor based functions for executing the application and services associated with the application. For example, processor based functions include 2D or 3D rendering, physics, physics simulation, scripting, audio, animation, graphics processing, lighting, shading, rasterization, ray tracing, shadowing, culling, transformation, artificial intelligence, etc. In that manner, the game engines implement game logic, perform game calculations, physics, geometry transformations, rendering, lighting, shading, audio, as well as additional in-game or game-related services. In addition, services for the application include memory management, multi-thread management, quality of service (QOS), bandwidth testing, social networking, management of social friends, communication with social networks of friends, social utilities, communication channels, audio communication, texting, messaging, instant messaging, chat support, game play replay functions, help functions, etc.

In one embodiment, the cloud game network 190 may support artificial intelligence (AI) based services including chatbot services (e.g., ChatGPT, etc.) that provide for one or more features, such as conversational communications, composition of written materiel, composition of music, answering questions, simulating a chat room, playing games, and others.

Users access the remote services with client devices 110, which include at least a CPU, a display and input/output (I/O). For example, users may access cloud game network 190 via communications network 150 using corresponding client devices 110 configured for updating a session controller (e.g., delivering and/or receiving user game state data), receiving streaming media, etc. The client device 110 can be a personal computer (PC), a mobile phone, a netbook, a personal digital assistant (PAD), handheld device, etc.

In one embodiment, client device 110 may be configured with a game title processing engine and game logic for at least some local processing of an application, and may be further utilized for receiving streaming content as generated by the application executing at a back-end server, or for other content provided by back-end server support. In still other embodiments, for independent local processing the game title processing engine 111 includes basic processor based functions for executing an application and services associated with the application, as previously described. For local processing, the game logic 115 is stored on the local client device 110 and is used for executing the application. For example, an instance of an application is executing by the game title processing engine 111 of a corresponding client device 110. Game logic 115 (e.g., executable code) implementing the application is stored on the corresponding client device 110, and is used to execute the application. For purposes of illustration, game logic 115 may be delivered to the corresponding client device 110 through a portable medium (e.g. optical media) or through a network (e.g., downloaded through the internet from a gaming provider).

In one embodiment, client device 110 may be configured as a thin client providing interfacing with a back end server (e.g., game server 160 of cloud game network 190) configured for providing computational functionality (e.g., including game title processing engine 111). In particular, client device 110 of a corresponding user (not shown) is configured for requesting access to applications over a communications network 150, such as the internet, and for rendering for display images generated by a video game executed by the game server 160, wherein encoded images are delivered (i.e., streamed) to the client device 110 for display in association with the corresponding user. For example, the user may be interacting through client device 110 with an instance of an application executing on a game processor of game server 160 in association with gameplay of a corresponding user, such as through input commands that are used to drive the gameplay. Client device 110 may receive input from various types of input devices, such as game controllers, tablet computers, keyboards, gestures captured by video cameras, mice, touch pads, audio input, etc. More particularly, an instance of the application is executed by the game title processing engine 111 and is configured for generating rendered images, which is delivered over network 150 for display at a corresponding display in association with client device 110. That is, client device 110 is configured for receiving encoded images (e.g., encoded from game rendered images generated through execution of a video game), and for displaying the images that are rendered for display. Game title processing engine 111 is able to support a plurality of applications using a plurality of game logics, each of which is selectable by the user.

Client device 110 may include a request handler 140 that is configured to handle user requests for replaying recent game play. For example, a request receiver 141 is configured to receive a request from the player, wherein the request may be presented in one of many forms, including through text, hand gestures, gestures, audio, natural voice, controller actions, etc. The event aware service interface 145 is configured to communicate with an event aware service 300 to include forwarding the request from the player. In that manner, post processing of telemetry data that is automatically captured may be performed to service the request, including replaying an event that occurred within recent game play. The event is associated with one or more image frames that are stored in a buffer.

In addition, system 100 includes a rewind mode service 120 configured to enable replaying of recent game play through a system implemented rewind mode of live game play. The rewind mode service 120 may be implemented at the client device 110 of a user. For example, when the video game is executing locally, the rewind mode service 120 can provide replaying of recent game play that is stored in temporary game play storage 130 (e.g., within buffer 133) that is local, such as being located at the client device 110. In another implementation, the rewind mode service 120 can be implemented at the back-end, such as via the cloud game network 190. For instance, when the video game is executed at the back-end cloud game network 190, the rewind mode service 120 in cooperation with the game server 160, that is communicating with a corresponding client device 110 of a user, can provide replaying of recent game play that is stored in temporary game play storage 130 (e.g., within buffer 133) located at the cloud game network 190. In another implementation, the rewind mode service 120 located at the back-end cloud game network 190 may work in cooperation with a game title engine 111 executing at a client device 110 to replay recent game play that is stored in temporary game play storage 130 (e.g., within buffer 133) located at the client device.

The rewind mode services 120 at the back-end, cloud game network 190 or at the local, client device 110 are similarly configured. In particular, when a video game is executing, image frames and other data that are generated for a corresponding game play are stored using temporary game play storage service 130. Storing of recent game play may be implemented in various manners. In embodiments, and for purposes of illustration, the temporary game play storage service 130 may communicate with a corresponding game title processing engine 111 (i.e., at client device 110 or at the cloud game network 190) and receive image frames of the corresponding game play as they are being generated. The image frames are encoded and/or compressed by encoder 131, and stored in a buffer 133. In one embodiment, the buffer 133 is a ring buffer operating as storage of fixed size that utilize a first-in and first-out logic, such that new data overwrites the oldest data. That is, the ring buffer continually cats its tail as new data is being stored. In another embodiment, the image frames are stored in buffer 133 without compression.

The amount of game play that is stored in temporary game play storage may vary depending on design, and may consider the use of memory, how much memory is available for storing game play, and storage techniques. For example, in various embodiments, recent game play may be stored in increments of up to 30 minutes, or up to 60 minutes, or up to 120 minutes, or up to 240 minutes, or up to 24 hours, or up to 48 hours, etc.

In addition, system 100 includes an event aware service 300 configured to analyze telemetry data of game plays of video games played by players to identify events occurring win the game play and automatically mark those events. In that manner, one or more image frames of a corresponding event may be replayed using a corresponding bookmark. The event aware service 300 may operate as a stand-alone server, or may be located within the cloud game network 190, or may be located within a client device 110.

In some embodiments, the analysis of the telemetry data of a game play of a video game may be performed using artificial intelligence via an AI layer. For example, the AI layer may be implemented via an AI model 170 as executed by a deep/machine learning engine 190 of the event aware service 300. For example, an image frame of a corresponding event may be bookmarked, wherein the bookmark enables replay of image frames corresponding to the event that are stored in a buffer. A bookmark and information relating the bookmark to one or more image frames stored in a buffer is stored in storage 180. For example, a pointer may indicate where the corresponding image frames of a corresponding bookmark for an event are stored, such as in a buffer in temporary game play storage at a client device 110 or at a back-end server (e.g., cloud game network 190). As such, a bookmark and pointer pair are stored on storage 180. An action engine 140 is configured to perform one or more actions on the events that are classified and/or identified. For example, an action engine 140 is configured to bookmark events automatically or through user interaction, and to replay events using the bookmarks (e.g., through a rewind mode service), as well as other actions.

Figure 2:
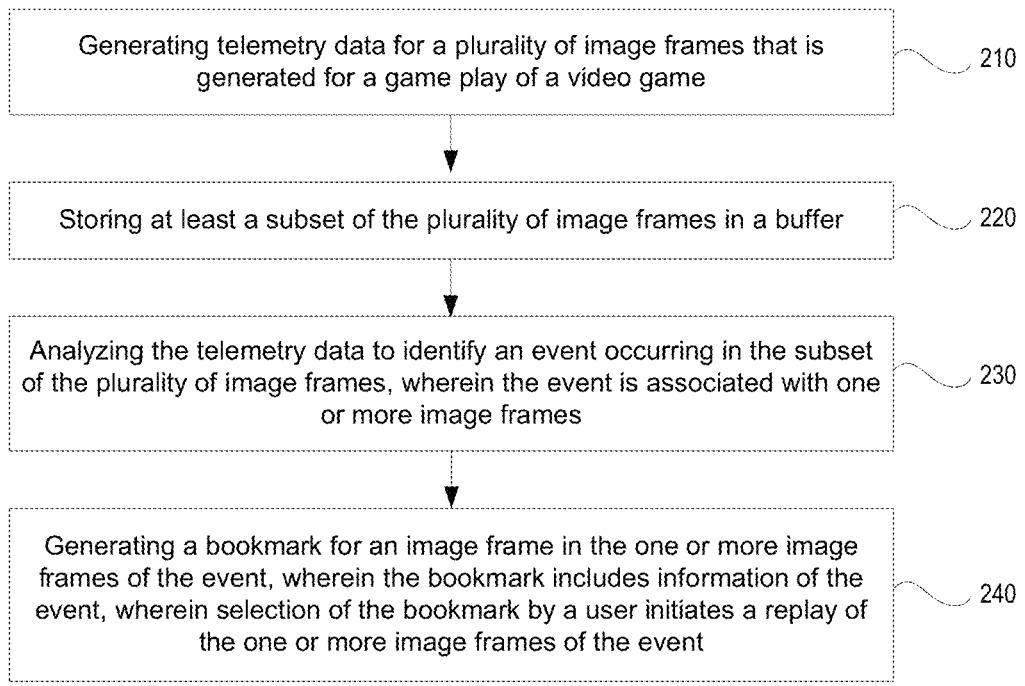
FIG. 2 is a flow diagram illustrating a method for analyzing telemetry data that is automatically captured of game play of a video game to identify events within the game play, and the automatic marking of at least one corresponding image frame for each of those events to enable replaying of image frames stored in a buffer for an event that is bookmarked, in accordance with one embodiment of the present disclosure.

With the detailed description of the system 100 of FIG. 1, flow diagram 200 of FIG. 2 discloses a method for analyzing telemetry data that is automatically captured of game play of a video game to identify events within the game play, and the automatic marking of at least one corresponding image frame for each of those events to enable replaying of image frames stored in a buffer for an event that is bookmarked, in accordance with one embodiment of the present disclosure. The operations performed in the flow diagram may be implemented by one or more of the entities previously described components, and also system 100 described in FIG. 1, including event aware service 300 and rewind mode service 120.

At 210, the method includes generating telemetry data for a plurality of image frames that is generated for a game play of a video game. In particular, telemetry data is generated during execution of the video game (e.g., game logic of a video game) in association with the game play of the video game. For example, telemetry data may be generated for each image frame of the game play, and includes game state and user data. The telemetry data that is generated is captured. In one embodiment, the telemetry data is captured by an event aware service. In another embodiment, the telemetry data that is captured is accessed and utilized by the event aware service. In one embodiment, the event aware service is located at a back-end server, such as a stand-alone server, or may be located within a cloud game network. In another embodiment, the event aware service is located at a local device, such as a client device.

At 220, the method includes storing at least a subset of the plurality of image frames in a buffer. For example, as image frames for a game play of video game are generated for display, the image frames may be stored temporarily, such as in a buffer. The image frames that are temporarily stored may be accessed in support of additional features, including sharing, replaying, etc. Purely for illustration purposes, a sequence of image frames stored in the buffer may be identified by the player, and packaged within a file for sharing with others. In another example provided for illustration, a sequence of image frames may be marked as an event, and may be accessed by the player via a rewind mode service for purposes of reviewing the game play of the event.

For efficient utilization of storage resources, not all the image frames generated for the game play are stored in the buffer. For example, the buffer may be of fixed size and can only store recent game play (e.g., the last 10 minutes, last 30 minutes, last 60 minutes, etc.). In one embodiment, the image frames are presented for display and stored in a ring buffer of fixed size. In one implementation, each image frame is encoded and/or compressed, and automatically stored in such a way that they can be accessed in sequential order (e.g., stored with a timestamp indicating when the image frame was generated, identification number, etc.). In another implementation, the image frames are stored without compression. Because the ring buffer is of a fixed size, new image frames are stored at a head of the ring buffer that cats a tail of the ring buffer once the storage limit has been reached, such that the new image frame is stored where the oldest image frame was stored. That is, the ring buffer implements a first-in and first-out logic of storing.

At 230, the method includes analyzing the telemetry data to identify an event occurring in the subset of the plurality of image frames, wherein the event is associated with one or more image frames. The telemetry data may be analyzed to determine events of importance, and/or significance, and/or relevance to the user (e.g., when a quest is first introduced, beating a boss, start at a first stage or any stage, entering a forest, exiting the forest, fought the ultimate boss, when a character died, acquiring a legendary weapon, facts provided by an NPC, etc.).

In one embodiment, the analysis may be performed through artificial intelligence techniques, such as building an AI model to parse out features in the game play and to classify or identify relevant events in the game play, wherein identified events in the game play may be associated with one or more image frames. In particular, features in the telemetry data are extracted and input into an AI model configured to classify and/or identify events in the game play. In addition, one or more image frames that corresponding to each event are identified.

At 240, the method includes marking at least one image frame for each event that is identified and/or classified. In one embodiment, a tag or bookmark is generated for a corresponding image frame taken from one or more image frames of the event. For example, the bookmark may correspond with an image frame near a start of the event. In addition, the bookmark includes information related to the event. For example, the bookmark may include metadata of the image frame, or that being generated for the event, or may include a description of the event.

More particularly, selection of the mark (e.g., tag, bookmark, etc.) by a user initiates a replay of one or more image frames of the event for review by the user. For example, selection of the mark by a user initiates a rewind mode service that accesses the image frames of the event form a buffer. The bookmark may include a pointer to the image frames that are stored in the buffer, wherein the pointer references locations in the buffer for the image frames of the event. The encoded image frames accessed from the buffer are decoded before presented for display for review by the user. For example, the rewind mode service may be entered by automatically switching from displaying the game play that is live to displaying the one or more image frames of the event beginning from the image frame that is bookmarked. In another implementation, the image frames are displayed in a window overlaid the game play that is live. In addition, the rewind mode service is configured to controlling display of the image frames of the event (e.g., play at normal sped or 1×, fast-forward at one or more speeds (e.g., 2×, 5×, 10×, etc.), fast-reverse at one or more speeds, pause, return back to live game play, etc.).

In one embodiment, the rewind mode service is accessed through actuation of a universal button by a user on a game controller during the game play of the video game during display of a current image frame. The universal button may provide access to multiple features through a single action—i.e., actuation of the universal button. For example, a user interface (e.g., showing a menu) may be displayed as an overlay to the image frames of the game play that is live. The user interface may list a plurality of features that are available, including the rewind mode service feature. For example, one feature may provide for a sharing service that creates a file allowing access to a portion of the game play that can be viewed by others. Another feature may include a highlight service, wherein one or more portions of the game play are packaged as a highlight reel that shows highlights of recent game play. Still another feature may provide for replay of an identified event, etc. (e.g., accessed via a rewind mode service). In one embodiment, instead of actuation of a universal button, the rewind mode feature is accessed using a dedicated button. In that case, the rewind mode is automatically enabled with the actuation of the dedicated button. Selection of the rewind mode service feature may present to the user a list of bookmarked events, such as within a user interface. Selection of a bookmark of a corresponding event automatically switches from displaying the game play that is live to display of the one or more image frames of the event beginning from the image frame that is bookmarked. The rewind mode service responds to one or more rewind controller inputs configured for controlling the displaying of the image frames of the event.

Figure 3:
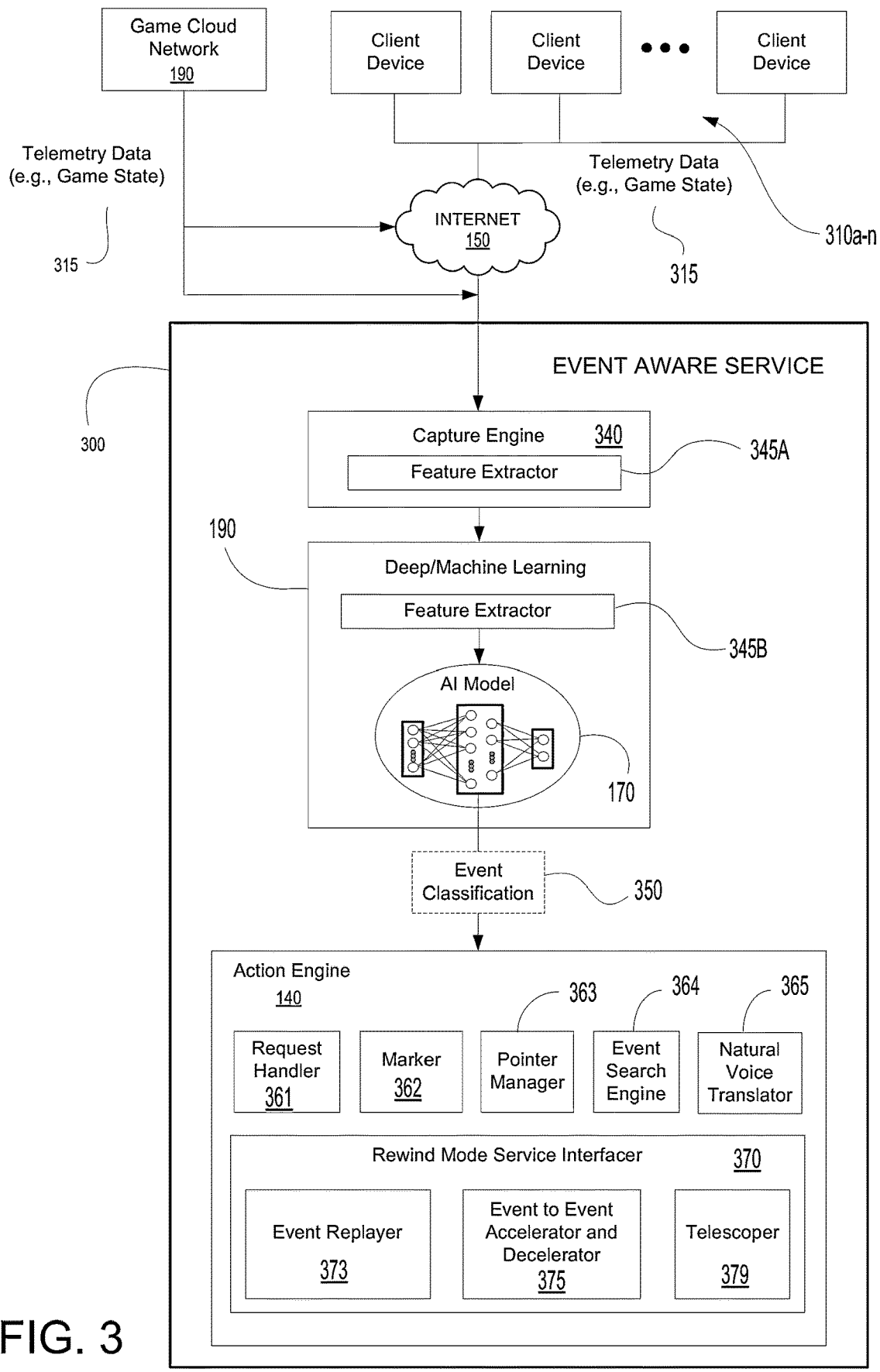
FIG. 3 is an illustration of a system configured to implement an artificial intelligence model configured for capturing telemetry data of game plays of video games, identifying events within the game plays, and the automatic marking of those events to enable replaying of image frames of corresponding events that are marked, in accordance with one embodiment of the present disclosure.

FIG. 3 is an illustration of a system configured to implement an artificial intelligence model configured for capturing telemetry data of game plays of video games, identifying events within the game plays, and the automatic marking of those events to enable replaying of image frames of corresponding events that are marked, in accordance with one embodiment of the present disclosure. In particular, the system may be implemented during game play of a video game by a user to classify and/or identify events that are occurring that may be of relevance, importance, and/or significance, and for facilitating access to image frames of the event in a rewind mode for the user. For purposes of illustration, FIG. 3 is described within the context of an event aware service 300, although it is understood that the operations performed within system of FIG. 3 can be performed by the cloud based network 190 or the client device 110 of FIG. 1.

Capture engine 340 of the event aware system 300 may be configured to capture game cloud network data, client device data, and other data in order to provide input into the AI model 160 for classification of events occurring during game plays of video games by players. That is, capture engine 340 is configured to capture and/or receive as input any data that may be used to identify and/or classify events. Selected portions of the captured data may be analyzed to identify and/or classify the events.

For example, capture engine 340 is configured to collect streams of telemetry data 315 from the game cloud network directly or through a network (e.g., internet 150, etc.) when corresponding video games are streamed, and is configured to collect telemetry data 315 from client devices 310a-n through a network (e.g., internet 150, etc.) when the corresponding video games are executed locally. In particular, telemetry data 315 is collected from a plurality of game plays of video games of a plurality of players. Telemetry data (or state data) may include game state data, user saved data, and metadata. Other data may include information about the player, such as biometric data, or motion data, or controller motion data that may indicate a particular emotion of the user (e.g., determine when the user is intense, or when the user is concentrating, etc.). Specifically, game state data defines the state of the game play of an executing video game for a player at a particular point in time. Game state data allows for the generation of the gaming environment at the corresponding point in the game play. For example, game state data may include states of devices used for rending the game play (e.g., states of the CPU, GPU, memory, register values, etc.), identification of the executable code to execute the video game at that point, game characters, game objects, object and/or game attributes, graphic overlays, and other information. User saved data includes information that personalizes the video game for the corresponding player. For example, user saved data may include character information and/or attributes that are personalized to a player (e.g., location, shape, look, clothing, weaponry, assets, etc.) in order to generate a character and character state that is unique to the player for the point in the game play, game attributes for the player (e.g., game difficulty selected, game level, character attributes, character location, number of lives, trophies, achievements, rewards, etc.), user profile data, and other information. Metadata is configured to provide relational information and/or context for other information, such as the game state data and the user saved data. For example, metadata may include information describing the gaming context of a particular point in the game play of a player, such as where in the game the player is, type of game, mood of the game, rating of game (e.g., maturity level), the number of other players there are in the gaming environment, game dimension displayed, the time of the collection of information, the types of information collected, region or location of the internet connection, which players are playing a particular gaming session, descriptive information, game title, game title version, franchise, format of game title distribution, network connectivity, downloadable content accessed, links, language, system requirements, hardware, credits, achievements, awards, trophies, and other information.

In some embodiments, telemetry data 115 may fall within four categories, including activity data, zone data, actor data, mechanics data, game media data, and other gameplay related data. In particular, activity data may include a description of a corresponding activity, an image associated with the activity (e.g., thumbnail), whether completion of an activity is required to complete the video game, whether the activity can be repeatedly played, whether there are nested tasks or child activities, activity availability, etc. Zone data may indicate area of a gaming world using a relevant coordinate system. Actor data may be associated with an entity or character within a game that is controlled by a user, and may include an actor identification, name for the actor, image of the actor, description of the actor, etc. Mechanics data may be associated with an item, skill or effect that can impact game play (e.g., weapons, etc.). Mechanics data may include a mechanic identification, name of the mechanic, image of the mechanic, description of the mechanic, availability to the player of the mechanic, steps needed to acquire the mechanic, mechanic inventory, mechanic use description, etc. Game media data may include an identification of the game media, a name for the game media, media format, type of media (e.g., cut-scene, level, audiolog, developer commentary, etc.), whether the media is associated with an activity, a start event, an end event, etc.

The telemetry is delivered to the feature extractor 345A that is configured to extract out the salient and/or relevant features from the telemetry data 315 that is useful in classifying events occurring within game plays of video games of players. The feature extractor may be configured to define features that are associated with game contexts, controller inputs, skill level of the player, and other data (e.g., biometric data, motion data of objects held or worn by the player including a controller or HMD, etc.). In some implementations, both feature definition and extraction is performed by the deep/machine learning engine 190, such that feature learning and extraction is performed internally within the deep/machine learning engine 190 within the feature extractor 345B. In particular, the feature extractor 345B has the capability to learn features that can be useful for identifying and/or classifying events occurring within game plays of video games. In some embodiments, the extraction and/or classification of features may be performed by the AI model 170. In that manner, extracted features can be classified and/or labeled (e.g., as gaming context data, user input data, user skill date, user behavior data, etc.). In that manner, the extracted features can be classified and/or labeled (e.g., as gaming context data, user input data, user skill data, user behavior data, etc.). In another embodiment, the extraction and/or classification of features may be performed by the deep/machine learning engine 190. As such, relevant features from the captured data (e.g., telemetry data 315) as identified by the feature extractor 345A and/or 345B useful in identifying and/or classifying events occurring within game plays of video games are provided as input to the deep learning/machine learning engine 190.

As shown, the deep/machine learning engine 190 is configured for implementation to classify events of importance or significance to a corresponding user/player (e.g., when a quest is first introduced, beating a boss, start at a first stage or any stage, fought the ultimate boss, when a character died, acquiring a legendary weapon, facts provided by an NPC, etc.). In one embodiment, the AI model 160 is a machine learning model configured to apply machine learning to classify the events occurring within game plays of video games of players. In another embodiment, the AI learning model is a deep learning model configured to apply deep learning to classify events occurring within game plays of video games of players, wherein machine learning is a sub-class of artificial intelligence, and deep learning is a sub-class of machine learning.

Purely for illustration, the deep/machine learning engine 190 may be configured as a neural network used to implement the AI model 170, in accordance with one embodiment of the disclosure. Generally, the neural network represents a network of interconnected nodes responding to input (e.g., extracted features) and generating an output (e.g., classification of events occurring within game plays of video games). In one implementation, the AI neural network includes a hierarchy of nodes. For example, there may be an input layer of nodes, an output layer of nodes, and intermediate or hidden layers of nodes. Input nodes are interconnected to hidden nodes in the hidden layers, and hidden nodes are interconnected to output nodes. Interconnections between nodes may have numerical weights that may be used link multiple nodes together between an input and output, such as when defining rules of the AI model 170.

In particular, the AI model 170 is configured to apply rules defining relationships between features and outputs (e.g., events occurring within game plays of video games, etc.), wherein features may be defined within one or more nodes that are located at one or more hierarchical levels of the AI model 170. The rules link features (as defined by the nodes) between the layers of the hierarchy, such that a given input set of data leads to a particular output (e.g., event classification 350) of the AI model 170. For example, a rule may link (e.g., using relationship parameters including weights) one or more features or nodes throughout the AI model 170 (e.g., in the hierarchical levels) between an input and an output, such that one or more features make a rule that is learned through training of the AI model 170. That is, each feature may be linked with one or more features at other layers, wherein one or more relationship parameters (e.g., weights) define interconnections between features at other layers of the AI model 170. As such, each rule or set of rules corresponds to a classified output. For example, the resulting output 350 according to the rules of the AI model 170 may predict whether an activity occurring within a game play of a video game is of relevance, or importance, or significance to the player or to the gaming community, and as such be labeled and/or classified as an event.

As such, during the implementation phase, the AI model 170 is executed to identify, predict and/or classify events occurring within game plays of video games of players based on the configuration of the AI model 170. That is, for a given set of extracted features that is provided as input to the AI model 170, an event classification 350 for game plays of video games of players may be output by the AI model. The AI model may be configured to identify the one or more image frames of a corresponding event, and to generate information of the event. In another embodiment, analysis of game state data related to a corresponding event provides for the identification of the image frames and the information.

Further, the output (e.g., event classification 350) from the AI model 170 may be used to determine a course of action to be taken for the given set of input (e.g., extracted features), as performed by the different services provided by the action engine 140. For example, a request handler 361 is configured to communicate with the request handler 140 at the client device to service user requests for bookmarking events, or to replay identified events, or generally to handle requests in any format from the user to play an event occurring within recent game play, etc. For example, a request received from a client device through a request handler 140 may be in the form of natural voice or language, wherein the natural voice translator 365 is able to translate the voice request into a format (e.g., text, etc.) that is readily handled by the request handler 361 of the event aware service 300. Also, marker 362 is configured to automatically mark (e.g., tag, bookmark, etc.) one or more image frames (e.g., starting image frame, ending image frame, etc.) of a corresponding event that is identified and/or classified. In addition, marker 362 may be configured to automatically mark one or more image frames based on user triggered actions, such as pausing on an image frame, playing a sequence of image frames, reviews thoroughly a sequence of image frames, etc. The mark provides for easy access to image frames when using a rewind mode service. Also, pointer manager 363 is configured to relate a bookmark to a location of a corresponding image frame in a corresponding buffer that temporarily stores recent game play of a corresponding game play of a video game by a user. That is, a corresponding pointer references placement of one or more image frames of the corresponding event in the buffer. Further, the event search engine 364 is able to search through one or more events that are identified and marked for a game play of a player playing a video game in support of a request by a user to review an event. For example, the user may make a request that generally asks to replay a conversation with a particular NPC (e.g., wherein the NPC game the user a quest). The request by the player is received by the request handler 361 at the event aware service 300 and handed off to the event search engine 364 to parse through the events that are marked within the game play of the player, and to select the event that matches the event described in the request.

The action engine 140 includes a rewind mode service interfacer 370 that communicates with a rewind mode service 120 of a corresponding client device or cloud game network 190, as previously introduced. In particular, once a corresponding event is identified, along with a corresponding bookmark for that event, one or more image frames for that event can be replayed using a rewind mode service. For example, the request handler 361 may handle a request for an event, wherein the request is handed off to the event replayer 373 to determine which bookmark and corresponding pointers are necessary. That information is passed back to the rewind mode service at the corresponding location to access the proper image frames in the corresponding buffer in order to replay the event. In addition, once events are identified, the event to event accelerator and decelerator 375 can provide information to a rewind mode service at a corresponding location indicating when to accelerate and decelerate fast-forwarding or fast-reversing, before and after an event, and when to play image frames at normal speed for an event. In that manner, when events are identified, a user may review recent game play stored in a buffer quickly and without providing additional rewind mode controller instructions as displayed image frames are automatically sped up or down or played at normal speed depending on proximity to a corresponding event that is classified and marked. Further, a telescope 379 is configured to filter out unnecessary image frames from recent game play (e.g., static images of a character when a player has stepped away from playing a video game) from storage in a corresponding buffer, such that an expanded time period of game play may be stored and accessed via the rewind mode service within the buffer.

In still another embodiment, the automatic classification of events occurring within a game play of a player playing a video game, and the automatic marking of corresponding image frames of those events may be implemented within a sharing service. For example, when a user generates a file including a portion of game play of a video game for purposes of sharing with others, one or more events within that portion of the game play may have been automatically classified and marked. In that manner, when a viewer is viewing the game play as accessed through the file, the viewer may be notified of one or more events occurring with the game play for review, and be presented with a user interface that allows for selection of one of events for replay, wherein image frames for the selected event are accessed using a corresponding bookmark pointing to a location where the image frames can be accessed in the file.

Figure 4A:
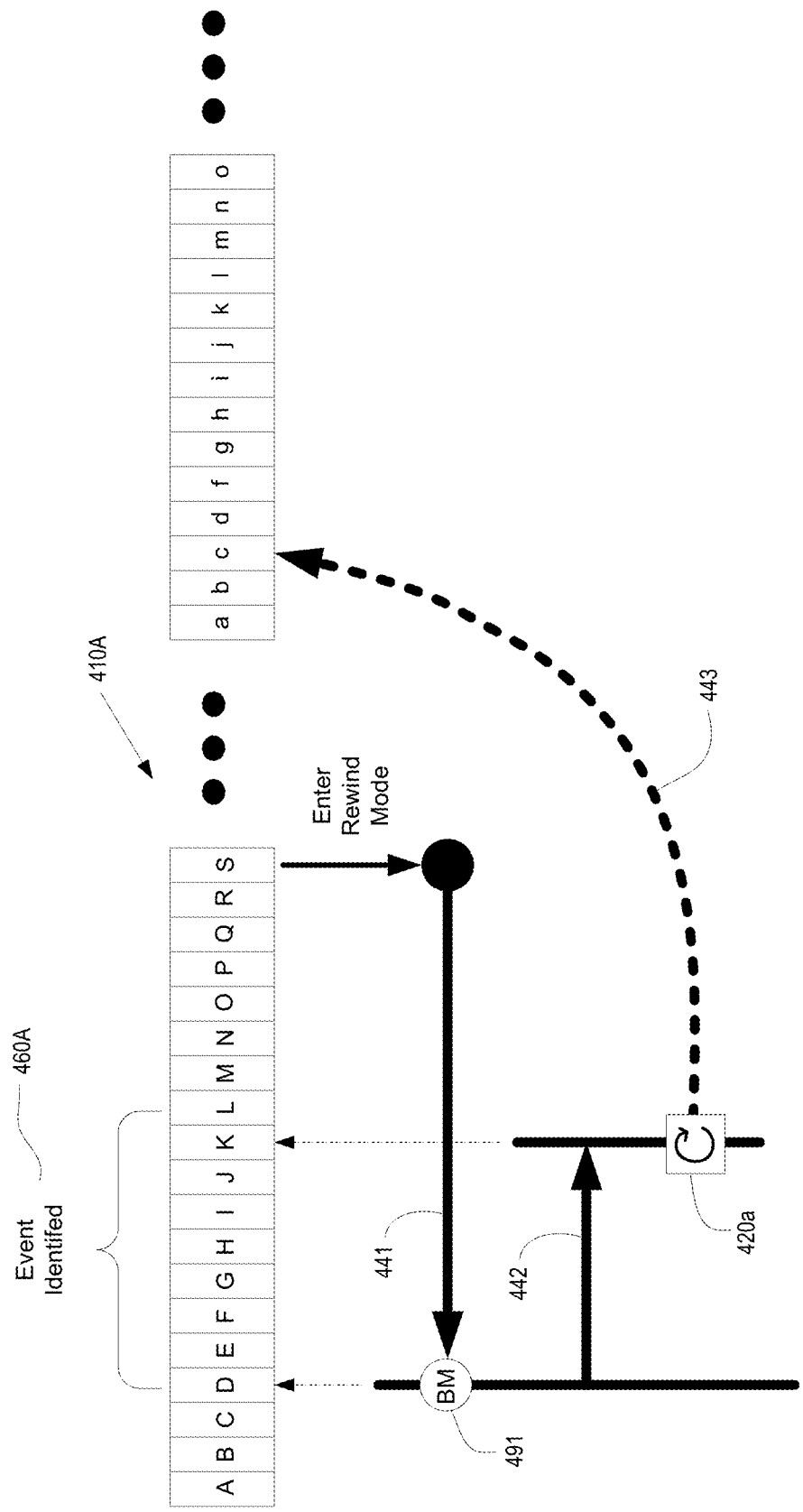
FIG. 4A is a diagram illustrating the replaying of an event occurring within a game play of a video game using a rewind mode service that accesses a bookmark of the event that is automatically identified and marked, in accordance with one embodiment of the present disclosure.
Figure 4B:
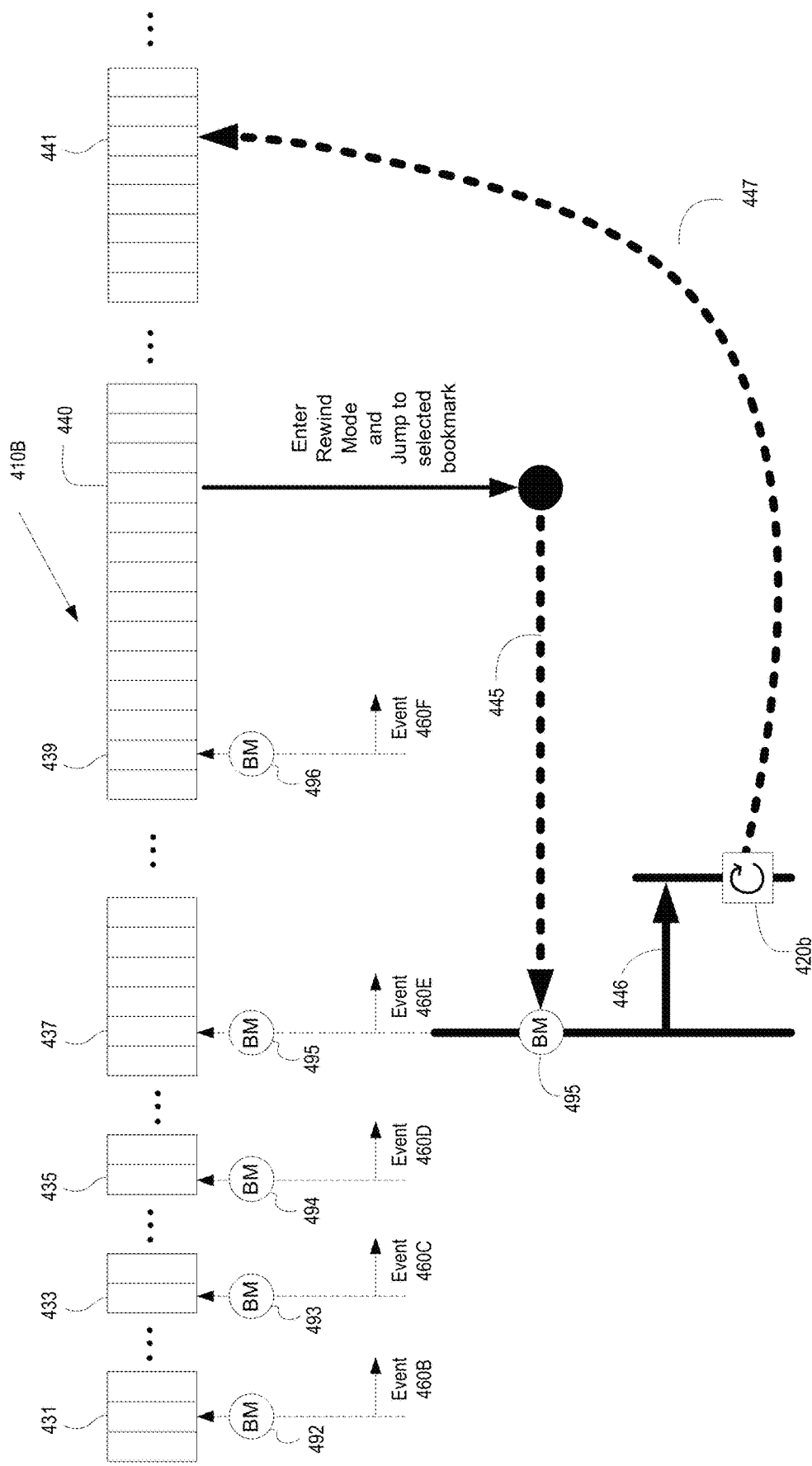
FIG. 4B is a diagram illustrating the automatic identification and marking of multiple events occurring within a game play of a video game through analysis of telemetry data of the game play that is automatically captured, wherein selection of a bookmark of an identified event enables replaying of image frames of the event that are stored in a buffer, in accordance with one embodiment of the present disclosure.
Figure 4C:
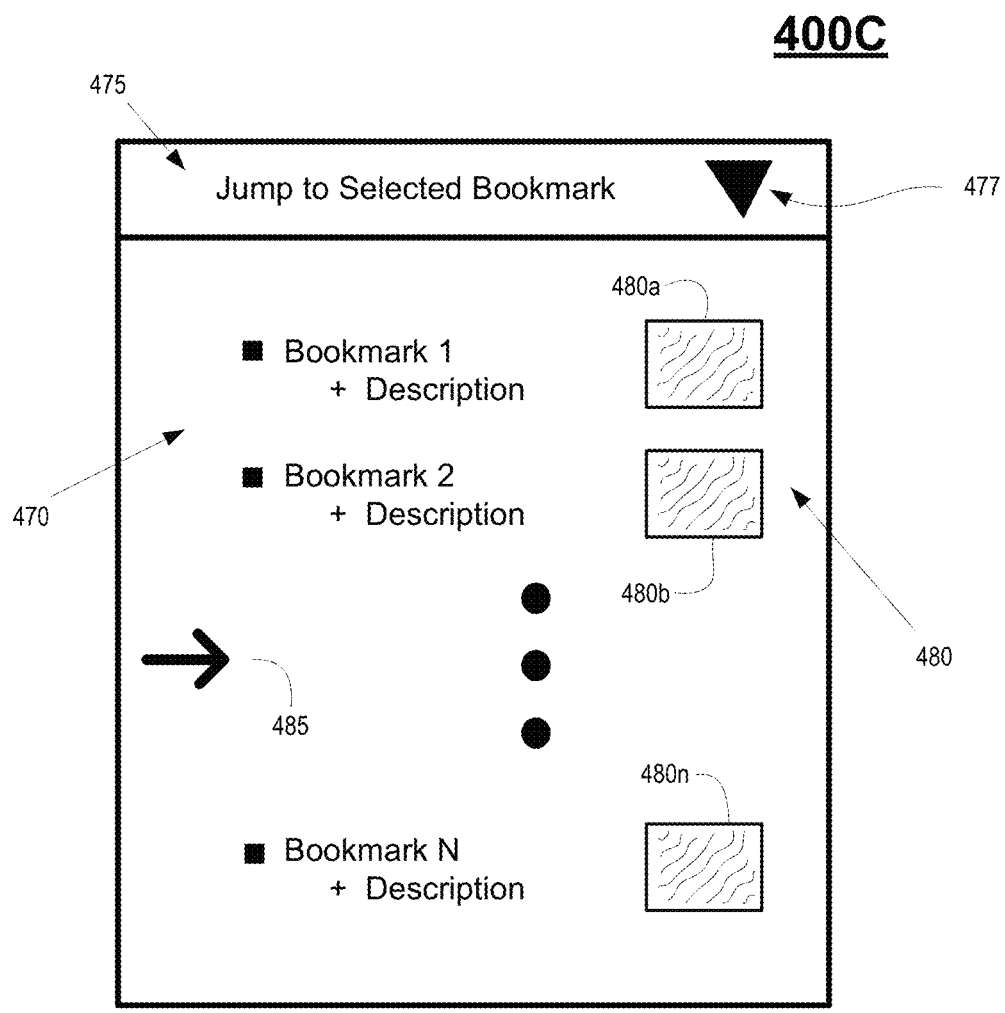
FIG. 4C illustrates a rewind mode service menu 300C configured to list one or more bookmarks that are automatically generated for image frames in recent game play of a video game by a user, in accordance with one embodiment of the present disclosure.

In embodiments, auto-bookmarking of image frames that corresponding to events that are identified through analysis of telemetry data associated with the image frames generated for the live game play are described in relation to FIGS. 4A-4C.

FIG. 4A is a diagram illustrating the replaying of an event occurring within a game play of a video game using a rewind mode service that accesses a bookmark of the event that is automatically identified and marked, in accordance with one embodiment of the present disclosure. The event is automatically identified and/or classified, and one or more image frames of the event are further marked for later access from a buffer storing recent game play.

A plurality of image frames 310A a live game play of the user playing a video game is shown. Each of the image frames are generated for display to the user on a corresponding device. For example, the plurality of image frames include image frames "A", "B", ... "Q", "R", "S" ... "a", "b", "c", ... "l", "m", "n", "o" ... "1", "2", "3" ... etc. For purposes of illustration, a relevant portion of the live game play may begin with image frame "A". During live game play, the image frames may be displayed to the user in sequence, with the next image fames being shown in order as "B", "C" ... "P", "Q", "R", "S".

For a current image frame "S", the user may wish to enter a rewind mode service to replay a classified event, or the user may automatically be entered into the rewind mode service via a request by the user to replay a classified event. For example, the user may enter the rewind mode service to search for an event by actuating a universal button, as previously described. The rewind mode service may be selected from a list of available features, wherein a list of events that are classified and marked are presented to the user for selection. Upon selection of an identified event 460A, the rewind mode service is able to jump to image frame "D" using the corresponding bookmark 491 as is shown along path 441 and begin a replay of image frames of the event beginning from image frame "D" as shown on path 442. As previously described, the image frames are accessed from a buffer (e.g., ring buffer) that stores recent game play of a user playing a video game. More particularly, displayed image frames may switch from the live game play to image frames played through the rewind mode service. If there is only one event that has been identified, the rewind mode service may automatically jump to image frame "D" without any user selection in order to replay the event. The image frames may be displayed at any predefined speed (e.g., static image showing, 1×, 2×, etc.) along path 442, and may be further controlled by the user (e.g., to increase or decrease speed of displaying in forward or reverse). In another implementation, the user is automatically entered into the rewind mode service in support of the request by the user to play the identified event 460A. That is, once the request to review the event is processed, the event is identified (i.e., as event 460A) and an associated bookmark is determined. As such, the rewind mode service is able to jump to image frame "D" using the corresponding bookmark 491 as is shown along path 441 and begin a replay of image frames of the event beginning from image frame "D" as shown on path 442.

After the user is done reviewing the event in the rewind mode, the user may return to live game play with actuation of return button at 420a at image frame "K", as shown on dotted path 443. A bookmark may be automatically created (triggered by user action to exit the rewind mode) for image frame "K" showing the end of the event of interest to the user. If during use of the rewind mode, the live game play is continuing from image frame "S", then path 443 returns to image frame "c". The live game play then continues from image frame "c" and is displayed to user. On the other hand, if the live game play is paused, then after exiting the rewind mode, the live game play then continues from image frame "S".

FIG. 4B is a diagram illustrating the automatic identification and marking of multiple events occurring within a game play of a video game through analysis of telemetry data of the game play that is automatically captured, wherein selection of a bookmark of an identified event enables replaying of image frames of the event that are stored in a buffer, in accordance with one embodiment of the present disclosure. A plurality of image frames 310B for a live game play of a user playing a video game is shown. Each of the image frames are generated for display to the user on a corresponding device.

As previously described, one or more events within the game play of the user are automatically classified and marked. In particular, for each event that is classified a corresponding bookmark is also automatically generated for a representative image frame of that event, wherein the event may be determined to cover one or more image frames. For example, bookmark 492 is generated for image frame 431 and corresponds to event 460B that is automatically classified; bookmark 493 is generated for image frame 433 and corresponds to event 460C that is automatically classified; bookmark 494 is generated for image frame 435 and corresponds to event 460D that is automatically classified; bookmark 495 is generated for image frame 437 and corresponds to event 460E that is automatically classified; and bookmark 496 is generated for image frame 439 and corresponds to event 460F that is automatically classified.

Auto-bookmarking of events within the recent game play allows for selected access of those events via the rewind mode service. In particular, the user may enter a rewind mode (e.g., actuate a universal button) and view one or more portions of recent game play. For example, for a current image frame 440, the user wishes to enter the rewind mode. The rewind mode service may be selected from a list of available features as provided in a user interface.

As previously described, a plurality of bookmarks is automatically generated for corresponding image frames of a plurality of events that are automatically classified. In addition, a list of bookmarks may be shown in the user interface for selection by the user. Also, thumbnails are also captured of corresponding image frames for each bookmark, and at least one of the bookmarks is presented with a corresponding thumbnail of a corresponding image frame.

For example, FIG. 4C illustrates a rewind mode service menu 400C configured to list one or more bookmarks that are automatically generated for image frames in recent game play of a video game by a user, in accordance with one embodiment of the present disclosure. As shown, the use interface may include a selectable feature 475 that allows the user to jump to a selected bookmark. Drop down icon 477 when actuated may list one or more bookmarks 470. For example, bookmarks 1 through N are shown in the menu 400C (e.g., shown in the user interface). Each of the bookmarks may also be shown with an accompanying description and a corresponding thumbnail. For example, bookmark 1 may have a corresponding thumbnail 480a, bookmark 2 may have a corresponding thumbnail 480b . . . and bookmark N may have a corresponding thumbnail 480n. The one or more bookmarks 470 may be aligned with the bookmarks 492 through 496 shown in FIG. 4B. For example, bookmark 1 may correspond to bookmark 492 and thumbnail 480a may correspond to image frame 431, and bookmark 2 may correspond to bookmark 493 and thumbnail 480b may correspond to image frame 433, and bookmark N may correspond to bookmark 496 and thumbnail 480n may correspond to image frame 439.

Returning back to FIG. 4B, the rewind mode service may receive selection of a bookmark (e.g., through selection arrow 485), such as bookmark 496 that is displayed in the menu and/or interface listing one or more bookmarks. As such, the rewind mode service is entered by automatically switching from displaying the live game play of the video game to displaying the image frame 437 associated with the selected bookmark 495.

That is, the rewind mode service is able to jump to image frame 437 using the corresponding bookmark 495 as is shown along dotted path 445 and begin a replay of image frames of the event beginning from image frame 437 as shown on path 446. As previously described, the image frames are accessed from a buffer (e.g., ring buffer) that stores recent game play of a user playing a video game. More particularly, displayed image frames may switch from the live game play to image frames played through the rewind mode service. In one embodiment, the first image frame is statically shown, and the user is able to control viewing image frames in forward or in reverse at a user selected speed. In another embodiment, the image frames are automatically displayed in forward or in reverse beginning with the first image frame at a predefined speed (e.g., 1×, 2×, etc.), with further control of the display of image frames by the user (e.g., forward speed, in reverse, reverse speed, pausing, etc.). For example, image frames may be displayed in forward in sequential order at normal speed along path 446.

After the user is done reviewing the recent game play in the rewind mode, the user may return to live game play with actuation of the return button at 420b at a corresponding image frame (not shown) along dotted path 447 A bookmark may be automatically created at that image frame. If during the rewind mode the live game play is continuing, then path 447 returns to image frame 441, wherein the live game play is displayed to the user. On the other hand, if the live game play is paused, then after exiting the rewind mode, the live game play then continues from image frame 440.

In one embodiment, a user is automatically entered into the rewind mode service in support of the request by the user to play a requested event. That is, once the request to review the event is processed, the event is identified (i.e., as event 460E) and an associated bookmark (i.e., bookmark 495) is determined. In particular, a request may be received and include one or more searchable descriptors to view a described event in the game play, wherein the request includes one or more descriptors of the described event. The request may be in a text format or an audio format, or any other suitable format, wherein the request is translated into a format that is understood by the event aware service, as previously described. For example, descriptors of the described event may be compared against descriptors of one or more events in the game play that are identified. Matching of the search to a particular event includes aligning an event that is identified and marked to the event described in the request. In that manner, the rewind mode service is automatically entered and begins playing image frames from the matched event using a corresponding bookmark.

Figure 5A:
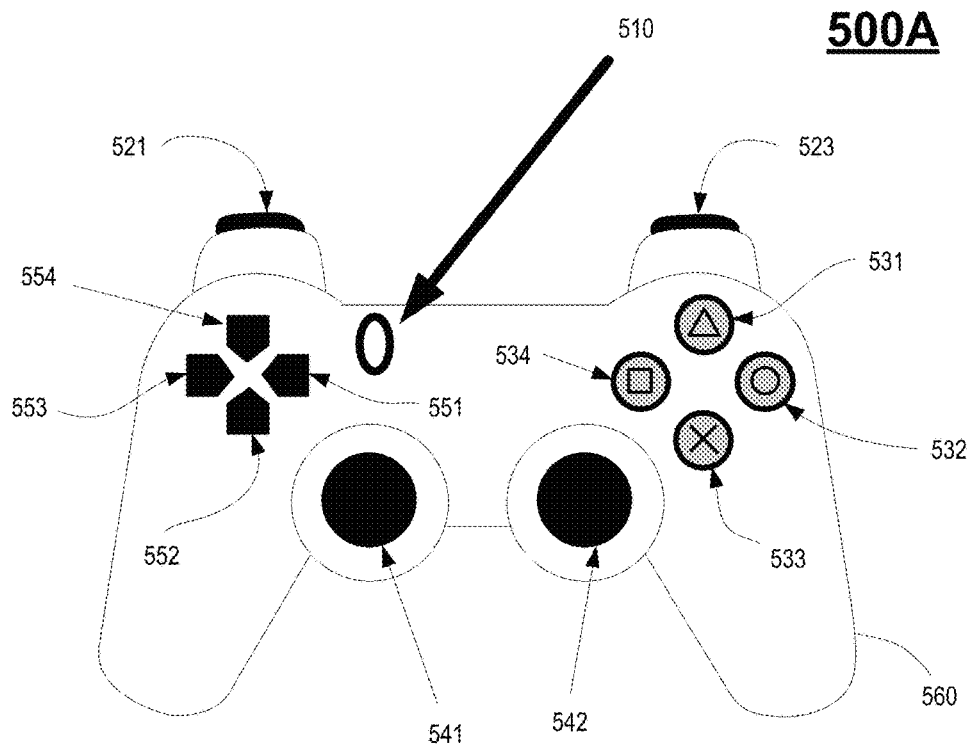
FIG. 5A illustrates a game controller used to access a rewind mode service during live game play enabling replay of image frames of recent game play stored in a buffer, in accordance with one embodiment of the present disclosure.

FIG. 5A illustrates a game controller 500A used to access a rewind mode service during live game play enabling replay of image frames of recent game play stored in a buffer, in accordance with one embodiment of the present disclosure. The game controller 500A may be used to control game play of a video game by a user. In addition, the game controller 500A may be used to enter a rewind mode, and control the display of image frames when in the rewind mode. Other embodiments support voice activated or other means for controlling access to and control of the rewind mode.

In particular, game controller 500A may include one or more interaction buttons that may be associated with one or more control instructions. The interaction buttons may include a left stick 541 and right stick 542. The interaction buttons may include a left shoulder button 521 and right shoulder button 523. A left trigger button (not shown) may be located below left shoulder button 521, and right trigger button (not shown) may be located below right shoulder button 523. In addition, the interaction buttons may include a group of direction instruction buttons including forward or up direction button 554, reverse or down direction button 552, left direction button 553, and right direction button 551. The interaction buttons may include another group of gaming buttons to include tringle button 531, circle button 532, cross button 533 and square button 534.

Game controller 500A includes a universal button 510 configured to provide access to one or more features, including the rewind mode. For example, the universal button 510 when actuated displays a list of features for the user, such as the rewind mode, a sharing mode for generating a file including a portion of game play that the user would like to share with others, a highlight reel mode that is used to generate a highlight reel of game play, etc.

Once in the rewind mode, one or more interaction buttons on the controller 500A may be used to control viewing of image frames from the buffer. For example, a first button may be configured to rewind or fast rewind; second button to pause or stop; third button to go forward or fast forward; fourth button to play from that point of the recorded game play being shown; and a fourth button to return back to live game play. For example, when in the rewind mode, left trigger may be used to display image frames in reverse with a first actuation playing image frames at 1× speed in reverse, and subsequent interactions at increasing speeds in reverse (e.g., 2×, 10×, etc.). Also, the right trigger may be used to display image frames in forward with a first actuation playing image frames at 1× speed, and subsequent interactions at increasing speeds in forward (e.g., 2×, 10×, etc.). The square button 534 may be used to pause on an image frame and/or play image frames beginning from a paused image frame. The triangle button 531 may be used to play image frames at any point in the rewind mode. The cross button 533 may be used to return to live game play.

Figure 5B:
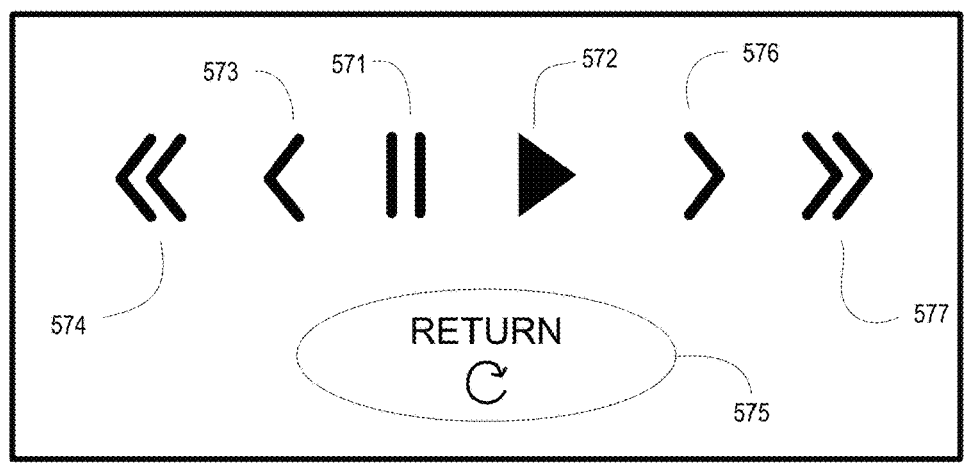
FIG. 5B illustrates a user interface used to control replaying of image frames of recent game play stored in a buffer implemented through a rewind mode service implemented during live game play of a video game, in accordance with one embodiment of the present disclosure.

FIG. 5B illustrates a user interface 500B used to control replaying of image frames of recent game play stored in a buffer implemented through a rewind mode service implemented during live game play of a video game, in accordance with one embodiment of the present disclosure. Instead of using buttons on a controller, other user interactions with the user interface 500B (e.g., hand gestures used to control selection of icons in the user interface 500B) may be used to control the display of image frames while in reverse mode. The user interface 500B may be overlaid the image frames shown in the display while in reverse mode.

For example, icon 572 when actuated instructs the rewind mode to display images in forward at normal speed at any point in the rewind mode. Also, icon 571 when actuated instructs the rewind mode to pause on a selected image frame at any point in the rewind mode. Icon 573 when actuated instructs the rewind mode to display images in reverse at a preselected speed (e.g., 1×, 2×, etc.) at any point in the rewind mode. Icon 574 when actuated instructs the rewind mode to display images in reverse at an increased speed from the current speed (e.g., increasing to 10×). Also, icon 576 when actuated instructs the rewind mode to display images in forward at a preselected speed (e.g., 1×, 2×, etc.) at any point in the rewind mode. Icon 577 when actuated instructs the rewind mode to display images in forward at an increased speed from the current speed (e.g., increasing to 10×).

In addition, icon 575 when actuated instructs the rewind mode to terminate and return back to displaying live game play. For example, when the live game play is continuing during use of rewind mode, the live game play returns to an updated current image. On the other hand, when the live game play is paused during the rewind mode, the live game play returns to the current image from which the rewind mode was first enabled.

In still another embodiment, hand gestures or other means may be used to control display of image frames in reverse mode as represented by the icons in the user interface. For example, swiping right with a hand or finger may indicate that the user would like to play forward at normal speed or fast forward through the image frames, with subsequent swipes to the right indicating an increase in the fast forward. Conversely swiping to the left indicates control of reverse mode display of image frames. An upward hand or finger position may indicate a pause or play. And a circle motion may indicate a return to live game play.

Figure 6A:
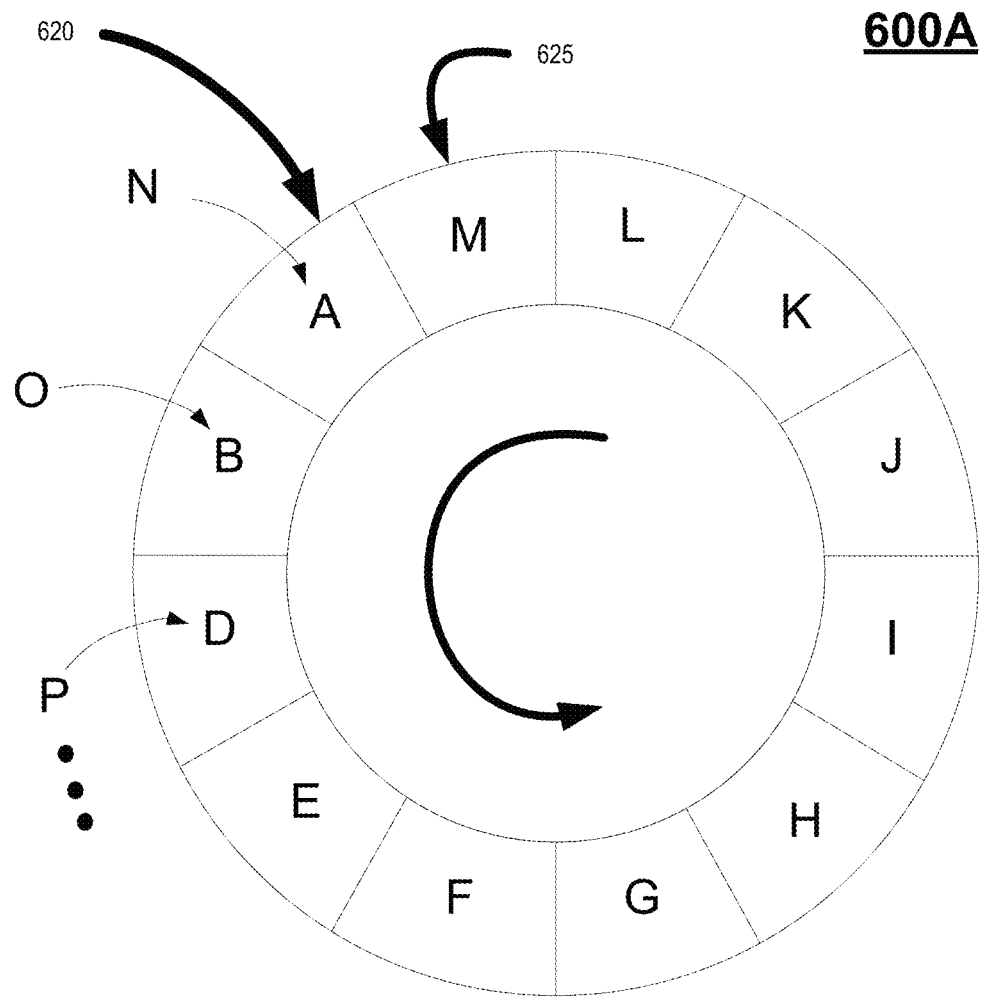
FIG. 6A illustrates a ring buffer configured to store image frames of live game play of a video game by a user, in accordance with one embodiment of the present disclosure.

FIG. 6A illustrates a ring buffer 600A configured to store image frames of live game play of a video game by a user, in accordance with one embodiment of the present disclosure. In particular, as image frames of the game play are being generated, those image frames are encoded and/or compressed, and stored in a buffer, such as the ring buffer 600A. As shown, ring buffer 600A is of fixed size, and utilizes first-in and first-out logic, such that new data overwrites the oldest data. For purposes of illustration only, the ring buffer may include 12 partitions, wherein each partition stores a corresponding image frame from the game play. The game play may include an ever increasing number of image frames, shown as image frames "A", "B", "C" . . . "N", "O", "P", etc. As such, image frame "A" is stored in partition 620 at the start of the game play. Because the ring buffer 600A is not full, the next image frame "B" is stored in the next partition, and so on. Image frame "M" is stored at partition 625, such that the ring buffer 600A now is full with each partition storing a corresponding image frame. Because first-in and first-out logic is utilized, the ring buffer 600A continually cats its tail as new data is being stored. For example, image frame "N", is stored in partition 620 by overwriting the data from image frame "A". Continuing with each generation of image frames, image frame "O" is stored in the next partition by overwriting the data from image frame "B", image frame "P" is stored in the following partition by overwriting the data from image frame "D", etc.

Figure 6B:
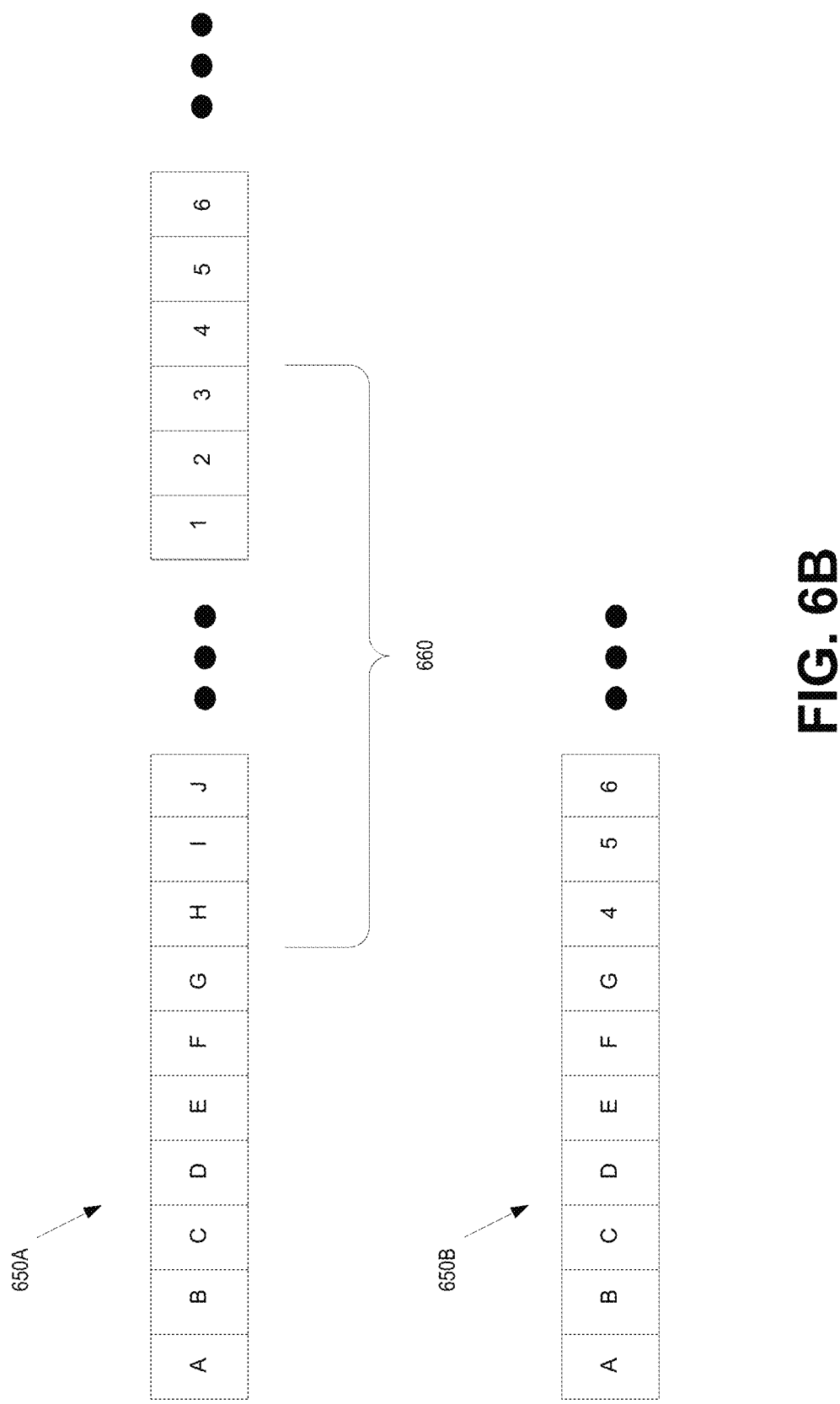
FIG. 6B illustrates the telescoping of image frames of live game play of a video game by a user to reduce the number of stored image frames of the live game play that are accessible via a rewind mode service enabling replay of the stored image frames, in accordance with one embodiment of the present disclosure.

FIG. 6B illustrates the telescoping of image frames of live game play of a video game by a user to reduce the number of stored image frames of the live game play that are accessible via a rewind mode service enabling replay of the stored image frames, in accordance with one embodiment of the present disclosure. As shown, a plurality of image frames 650A is being generated for live game play of a video game by a user. For example, the image frames 650A may include image frames "A", "B", "C" . . . "H", "I", "J" . . . "1", "2", "3", "4", "5", "6", etc. Typically, these image frames may be stored directly into a buffer, as previously described, with or without encoding.

With telescoping, analysis is performed on the plurality of image frames 650A to determine image frames that have little to no importance, such as through a filter. The analysis may be based on telemetry data associated with the image frames, or may be based on the image frames themselves (e.g., artificial intelligence used to identify features in the image frames, etc.). The filter may determine when one or more image frames in the game play of a user illustrate inactivity by the corresponding user, or no relevant progress being made in the video game, and prevent those identified image frames from being stored in the buffer. Any suitable criteria may be used to identify image frames of little to no importance for purposes of not being stored in buffer or telescoping. For example, when the user steps away from a game play session, a character may enter into a static or near catatonic state just waiting for the next controller input (e.g., standing in one place and breathing). For illustration purposes only, a group of image frames 660 is identified as having little to no importance. The group of image frames includes frames "H", "I", "J" . . . "1", "2", and "3".

These image frames identified as having little to no value can be removed from storing to the buffer, or if already stored then removed from the buffer. In either case, after removal of the group of image frames 660, a reduced plurality of image frames 650B is then stored in the buffer. This may be important when wanting to increase the amount of game play in a buffer that is of fixed size. That is, by removing one or more image frames, more of the game play occurring over an increased span of time may be stored. For example, while a buffer may typically store up to 120 minutes of recent game play, when filtering of image frames is performed the buffer may effectively store up to 200 minutes or more of the recent game play by including image frames that are determined to have importance.

Figure 6C:
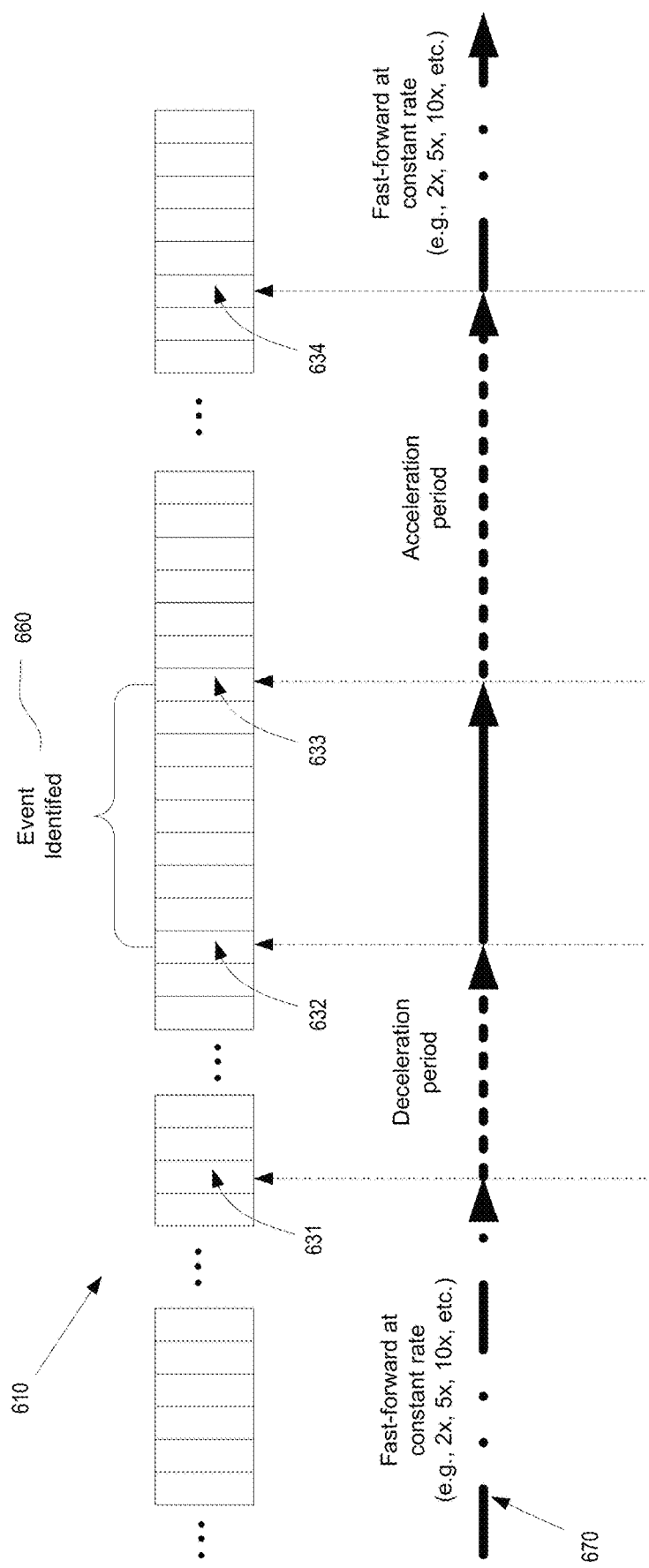
FIG. 6C illustrates acceleration and deceleration when encountering an event while fast-forwarding and/or fast-reversing through image frames of recent game play of a video game, wherein the event is automatically identified and marked through analysis of telemetry data of the game play, in accordance with one embodiment of the present disclosure.

FIG. 6C illustrates acceleration and deceleration when encountering an event while fast-forwarding and/or fast-reversing through image frames of recent game play of a video game, wherein the event is automatically identified and marked through analysis of telemetry data of the game play, in accordance with one embodiment of the present disclosure. For example, when displaying image frames of recent game play in forward or reverse, the speed of the image frames may be increased and decreased over time automatically. In particular, when first displaying the image frames in forward or reverse the speed may be gradually increased or accelerated as long as the user does not interrupt the display with a control instruction, as the user is happy to use the automatic display of image frames at various speeds. In that manner, the user is able to view recent game play quickly. In addition, when an event of importance that has been tagged and/or identified is approaching, the display of the image frames may be decelerated to a speed (e.g., 1×, 2×, etc.) that the user is able to review and process image frames during that event. Once the image frames for that event have been passed, then the display of image frames are gradually accelerated again until the next event, at which point the display of image frames is decelerated to an appropriate speed.

For example, a plurality of image frames 610 of a game play of a video game by a user is shown. In addition, an event 660 has been classified and/or identified, wherein the event spans across approximately image frame k632 to image frame 633. Because the event 660 has been marked and image frames associated with the event have also been identified, when the user is replaying recent game play that is stored in a buffer, the rewind mode service may handle the display of images by automatically determining how fast to play image frames based on events that are classified within the recent game play. The acceleration and deceleration of the display of image frames can be performed while forwarding or fast forwarding through the image frames, or while reversing or fast-reversing through the image frames.

For purposes of illustration, the rewind mode service may be replaying image frames in forward. As shown in timeline 670, the displaying of image frames before image frame 631 may be performed at a constant rate (e.g., 2×, 5×, 10×, etc.), such as when reaching an appropriate speed to quickly go through image frames while still enabling the user to adequately review the image frames. A period of acceleration to the current speed may have been performed. Between image frames 631 and 632, the rate of display of image frames in fast forward (i.e., while in rewind mode service) is automatically decelerated because of an upcoming event 660 that has been classified, and determined to begin with image frame 632. That is, the user is given notice through the slowing of the display of image frames that an event is upcoming. Beginning with image frame 632, the rate of display of image frames of the event is a normal speed or some predetermined speed (e.g., 2×). Once the showing of the event has passed, between image frames 633 and 634, the rate of display of image frames in fast forward is automatically accelerated. The acceleration of displaying image frames may end once a maximum rate of display has been reached, such as at image frame 634, and the displaying of image frames after image frame 634 may be performed at a constant rate (e.g., 2×, 5×, 10×, etc.), such as when reaching an appropriate speed to quickly go through image frames while still enabling the user to adequately review the image frames.

In another embodiment, frame interpolation is performed when fast-forwarding or fast reversing of image frames of recent game play stored in a buffer. Typically, during compression intra-coded (I-frames) image frames are generated that is a complete image, and predicted (P-frames) image frames are also generated that are built based on a previous I-frame and one or more intervening P-frames. B-frames can use frames on either side of the image frame for building the corresponding image frame. When fast-forwarding or fast-reversing the display of image frames, typically only I-frames are decoded and displayed. This may present choppy sequences of image frames for viewing as not all I-frames are displayed. Rather than encode all the intervening I-frames and P-frames to select one or more additional frames for display in order to smooth out the fast-forwarding or fast-reversing of image frames, frame interpolation can be performed. That is, one or more interpolated frames between any two I-frames, that are displayed in fast-forward or in fast-reverse, may be generated based on the I-frames. The one or more interpolated frames may also be displayed between corresponding I-frames during the fast-forwarding or fast-reversing of image frames to smooth out the choppiness introduced when gaps between I-frames that are displayed are large. Frame interpolation may also benefit from fast decoding. That is, if image frames can be decoded at a faster rate (e.g., double) than the rate of display, then more image frames may be used for interpolation.

Figure 7:
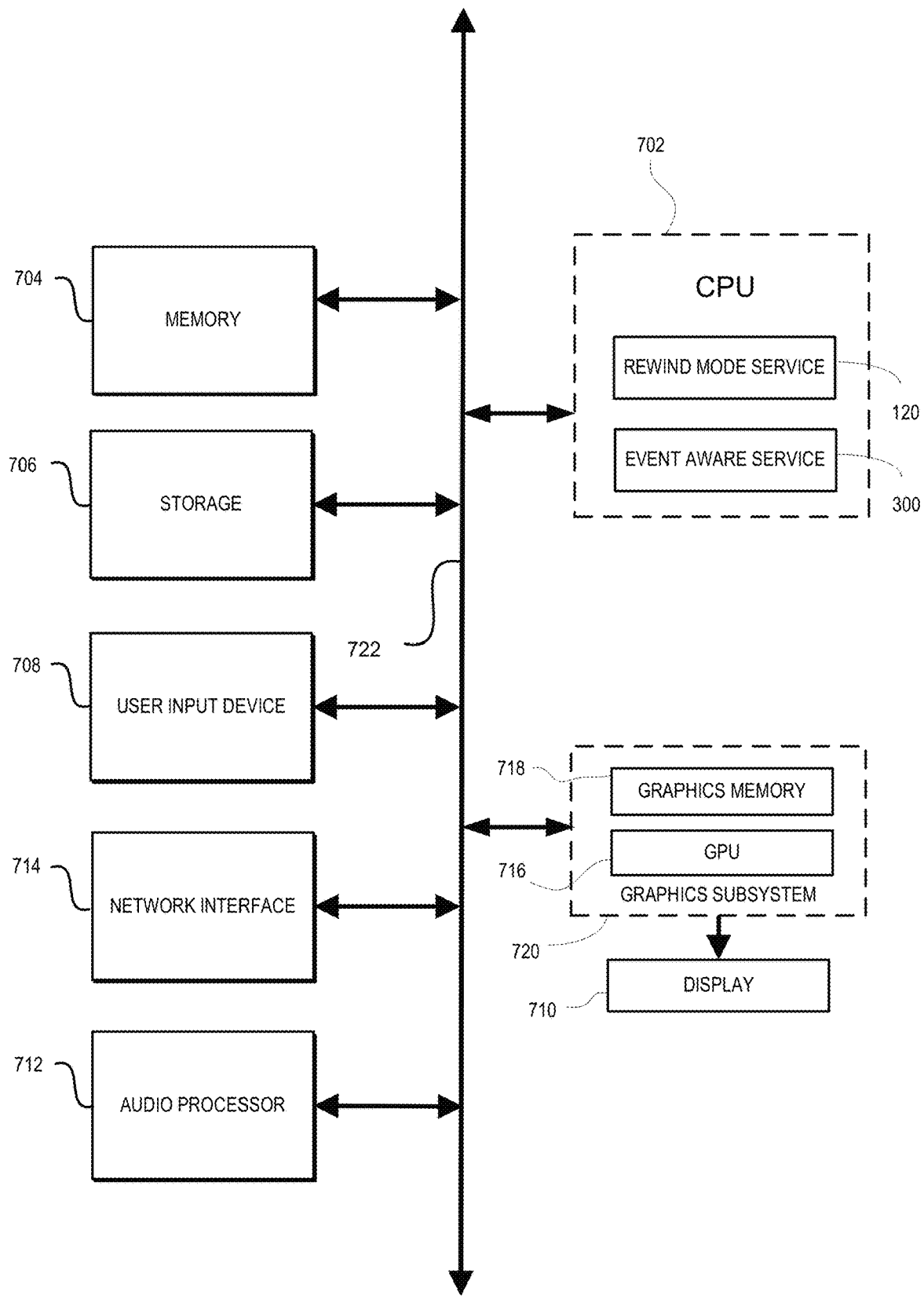
FIG. 7 illustrates components of an example device that can be used to perform aspects of the various embodiments of the present disclosure.

FIG. 7 illustrates components of an example device 700 that can be used to perform aspects of the various embodiments of the present disclosure. This block diagram illustrates a device 700 that can incorporate or can be a personal computer, video game console, personal digital assistant, a server or other digital device, suitable for practicing an embodiment of the disclosure. Device 700 includes a central processing unit (CPU) 702 for running software applications and optionally an operating system. CPU 702 may be comprised of one or more homogeneous or heterogeneous processing cores. For example, CPU 702 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 700 may be a localized to a user/player playing a game segment (e.g., game console), or remote from the player (e.g., back-end server processor), or one of many servers using virtualization in a game cloud system for remote streaming of gameplay to clients, or for implementing additional services such as a supervisor functionality.

In particular, CPU 702 may be configured to implement an event aware service 300 configured to automatically capture of telemetry data of a game play of a video game by a user, analyze the telemetry data to classify and/or identify one or more events occurring within the game play, and automatically mark at least one corresponding image frame for each of those classified and/or identified events to enable replaying image frames of the event that are stored in a buffer. Alternatively, CPU 702 may be configured to implement a rewind mode service 120 configured to enable replaying of recent game play through a system implemented rewind mode of live game play. The rewind mode is accessible via a universal button to enable replaying of image frames of the game play stored in a buffer. In that manner, the user is able to enter the rewind mode from the live game play using one or more controller inputs to view recent game play (e.g., rewinding, fast-forwarding, playing, etc.), and return to live game play afterwards.

Memory 704 stores applications and data for use by the CPU 702. Storage 706 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 708 communicate user inputs from one or more users to device 700, examples of which may include keyboards, mice, joysticks, touch pads, touch screens, still or video recorders/cameras, tracking devices for recognizing gestures, and/or microphones. Network interface 714 allows device 700 to communicate with other computer systems via an electronic communications network, and may include wired or wireless communication over local area networks and wide area networks such as the internet. An audio processor 712 is adapted to generate analog or digital audio output from instructions and/or data provided by the CPU 702, memory 704, and/or storage 706. The components of device 700, including CPU 702, memory 704, data storage 706, user input devices 708, network interface 710, and audio processor 712 are connected via one or more data buses 722.

A graphics subsystem 720 is further connected with data bus 722 and the components of the device 700. The graphics subsystem 720 includes a graphics processing unit (GPU) 716 and graphics memory 718. Graphics memory 718 includes a display memory (e.g., a frame buffer) used for storing pixel data for each pixel of an output image. Graphics memory 718 can be integrated in the same device as GPU 716, connected as a separate device with GPU 716, and/or implemented within memory 704. Pixel data can be provided to graphics memory 718 directly from the CPU 702. Alternatively, CPU 702 provides the GPU 716 with data and/or instructions defining the desired output images, from which the GPU 716 generates the pixel data of one or more output images. The data and/or instructions defining the desired output images can be stored in memory 704 and/or graphics memory 718. In an embodiment, the GPU 716 includes 3D rendering capabilities for generating pixel data for output images from instructions and data defining the geometry, lighting, shading, texturing, motion, and/or camera parameters for a scene. The GPU 716 can further include one or more programmable execution units capable of executing shader programs. In one embodiment, GPU 716 may be implemented within an AI engine (e.g., machine learning engine 190) to provide additional processing power, such as for the AI, machine learning functionality, or deep learning functionality, etc.

The graphics subsystem 720 periodically outputs pixel data for an image from graphics memory 718 to be displayed on display device 710. Display device 710 can be any device capable of displaying visual information in response to a signal from the device 700, including CRT, LCD, plasma, and OLED displays. Device 700 can provide the display device 710 with an analog or digital signal, for example.

In other embodiments, the graphics subsystem 720 includes multiple GPU devices, which are combined to perform graphics processing for a single application that is executing on a corresponding CPU. For example, the multiple GPUs can perform alternate forms of frame rendering, wherein GPU 1 renders a first frame, and GPU 2 renders a second frame, in sequential frame periods, and so on until reaching the last GPU whereupon the initial GPU renders the next video frame (e.g., if there are only two GPUs, then GPU 1 renders the third frame). That is the GPUs rotate when rendering frames. The rendering operations can overlap, wherein GPU 2 may begin rendering the second frame before GPU 1 finishes rendering the first frame. In another implementation, the multiple GPU devices can be assigned different shader operations in the rendering and/or graphics pipeline. A master GPU is performing main rendering and compositing. For example, in a group including three GPUs, master GPU 1 could perform the main rendering (e.g., a first shader operation) and compositing of outputs from slave GPU 2 and slave GPU 3, wherein slave GPU 2 could perform a second shader (e.g., fluid effects, such as a river) operation, the slave GPU 3 could perform a third shader (e.g., particle smoke) operation, wherein master GPU 1 composites the results from each of GPU 1, GPU 2, and GPU 3. In that manner, different GPUs can be assigned to perform different shader operations (e.g., flag waving, wind, smoke generation, fire, etc.) to render a video frame. In still another embodiment, each of the three GPUs could be assigned to different objects and/or parts of a scene corresponding to a video frame. In the above embodiments and implementations, these operations could be performed in the same frame period (simultaneously in parallel), or in different frame periods (sequentially in parallel).

Accordingly, in various embodiments the present disclosure describes systems and methods configured for analyzing telemetry data that is automatically captured of game play of a video game to automatically classify and/or identify events within the game play, and the automatic marking of at least one corresponding image frame for each of those events to enable replaying image frames of the event that are stored in a buffer.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

Access to the cloud gaming network by the client device may be achieved through a communication network implementing one or more communication technologies. In some embodiments, the network may include 5th Generation (5G) network technology having advanced wireless communication systems. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in the prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g., tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method, comprising:
    generating telemetry data for a plurality of image frames that is generated for a game play of a video game;
    storing at least a subset of the plurality of image frames in a buffer;
    analyzing the telemetry data to identify an event occurring in the subset of the plurality of image frames, wherein the event is associated with one or more image frames; and
    generating a bookmark for an image frame in the one or more image frames of the event, wherein the bookmark includes information of the event, wherein selection of the bookmark by a user initiates a replay of the one or more image frames of the event;
    displaying one or more bookmarks associated with one or more events that are identified in a user interface simultaneous with display of a current image frame of the game play, wherein the one or more bookmarks being displayed includes the bookmark of the event;
    receiving selection of the bookmark of the event;
    accessing the bookmark of the event from the storage;
    using the bookmark to access the one or more image frames of the event from the buffer, wherein the information associated with the bookmark includes a pointer that references locations of the one or more image frames of the event in the buffer; and
    displaying the one or more image frames of the event beginning from the image frame that is bookmarked.

2. The method of claim 1, wherein the analyzing the telemetry data includes:
    extracting a plurality of features in the telemetry data related to the game play;
    executing an AI model using the plurality of features to classify the event,
    wherein the plurality of features is provided as input to the AI model configured to identify one or more events within the game play,
    wherein the AI model identifies the one or more image frames of the event,
    wherein the AI model generates the information of the event.

3. The method of claim 1, further comprising:
    for a corresponding bookmark of the one or more bookmarks being displayed, displaying a corresponding description of a corresponding event; and
    displaying a corresponding thumbnail of a representative image frame of the corresponding event,
    wherein information for the corresponding bookmark includes a corresponding pointer that references placement of one or more image frames of the corresponding event in the buffer.

4. The method of claim 1, wherein the displaying the one or more image frames of the event includes:
  entering a rewind mode by automatically switching from displaying the game play that is live to displaying the one or more image frames of the event; and
  responding to one or more rewind controller inputs configured for controlling the displaying of the subset of the plurality of image frames including the image frames of the event in the rewind mode.

5. The method of claim 1, further comprising:
  receiving actuation of a universal button on a game controller during the game play of the video game, wherein the plurality of image frames is generated in response to game controller input, wherein a current image frame is being displayed when the universal button is actuated;
  receiving selection of a rewind mode from a plurality of features presented in a user interface displayed simultaneous with the game play that is live in response to the actuation of the universal button;
  automatically entering the rewind mode by automatically switching from display of the game play that is live to display of the one or more image frames of the event beginning from the image frame that is bookmarked; and
  responding to one or more rewind controller inputs configured for controlling the displaying of the subset of the plurality of image frames including the image frames of the event in the rewind mode.

6. The method of claim 1, further comprising:
  receiving a request including one or more searchable descriptors to view a described event in the game play, wherein the request includes one or more descriptors of the described event, wherein the request may be in a text format or an audio format;
  comparing the descriptors of the described event to one or more events in the game play that are identified; and
  aligning the event that is identified and that occurs in the subset of the plurality of image frames to the described event.

7. The method of claim 1, wherein the storing at least the subset of the plurality of image frames includes:
  encoding each of the subset of the plurality of image frames; and
  automatically storing the each of the subset of the plurality of image frames that is encoded in the buffer in sequential order,
  wherein the buffer is a ring buffer that stores a new image frame at a head of the ring buffer and deletes a last image frame at a tail of the ring buffer once a storage limit of the ring buffer has been reached.

8. A non-transitory computer-readable medium storing a computer program for performing a method, the computer-readable medium comprising:
  program instructions for generating telemetry data for a plurality of image frames that is generated for a game play of a video game;
  program instructions for storing at least a subset of the plurality of image frames in a buffer;
  program instructions for analyzing the telemetry data to identify an event occurring in the subset of the plurality of image frames, wherein the event is associated with one or more image frames; and
  program instructions for generating a bookmark for an image frame in the one or more image frames of the event, wherein the bookmark includes information of the event, wherein selection of the bookmark by a user initiates a replay of the one or more image frames of the event;
  program instructions for displaying one or more bookmarks associated with one or more events that are identified in a user interface simultaneous with display of a current image frame of the game play, wherein the one or more bookmarks being displayed includes the bookmark of the event;
  program instructions for receiving selection of the bookmark of the event;
  program instructions for accessing the bookmark of the event from the storage;
  program instructions for using the bookmark to access the one or more image frames of the event from the buffer, wherein the information associated with the bookmark includes a pointer that references locations of the one or more image frames of the event in the buffer; and
  program instructions for displaying the one or more image frames of the event beginning from the image frame that is bookmarked.

9. The non-transitory computer-readable medium of claim 8, wherein the program instructions for analyzing the telemetry data includes:
  program instructions for extracting a plurality of features in the telemetry data related to the game play;
  program instructions for executing an AI model using the plurality of features to classify the event,
  wherein the plurality of features is provided as input to the AI model configured to identify one or more events within the game play,
  wherein the AI model identifies the one or more image frames of the event,
  wherein the AI model generates the information of the event.

10. The non-transitory computer-readable medium of claim 8, further comprising:
  program instructions for displaying a corresponding description of a corresponding event, for a corresponding bookmark of the one or more bookmarks being displayed; and
  program instructions for displaying a corresponding thumbnail of a representative image frame of the corresponding event,
  wherein information for the corresponding bookmark includes a corresponding pointer that references placement of one or more image frames of the corresponding event in the buffer.

11. The non-transitory computer-readable medium of claim 8, wherein the program instructions for displaying the one or more image frames of the event includes:
  program instructions for entering a rewind mode by automatically switching from displaying the game play that is live to displaying the one or more image frames of the event; and
  program instructions for responding to one or more rewind controller inputs configured for controlling the displaying of the subset of the plurality of image frames including the image frames of the event in the rewind mode.

12. The non-transitory computer-readable medium of claim 8, further comprising:
  program instructions for receiving a request including one or more searchable descriptors to view a described event in the game play, wherein the request includes one or more descriptors of the described event, wherein the request may be in a text format or an audio format;

program instructions for comparing the descriptors of the described event to one or more events in the game play that are identified; and program instructions for aligning the event that is identified and that occurs in the subset of the plurality of image frames to the described event.

13. A computer system comprising:
a processor;
memory coupled to the processor and having stored therein instructions that, if executed by the computer system, cause the computer system to execute a method, comprising:
generating telemetry data for a plurality of image frames that is generated for a game play of a video game;
storing at least a subset of the plurality of image frames in a buffer;
analyzing the telemetry data to identify an event occurring in the subset of the plurality of image frames, wherein the event is associated with one or more image frames; and
generating a bookmark for an image frame in the one or more image frames of the event, wherein the bookmark includes information of the event,
wherein selection of the bookmark by a user initiates a replay of the one or more image frames of the event;
displaying one or more bookmarks associated with one or more events that are identified in a user interface simultaneous with display of a current image frame of the game play, wherein the one or more bookmarks being displayed includes the bookmark of the event;
receiving selection of the bookmark of the event;
accessing the bookmark of the event from the storage;
using the bookmark to access the one or more image frames of the event from the buffer, wherein the information associated with the bookmark includes a pointer that references locations of the one or more image frames of the event in the buffer; and
displaying the one or more image frames of the event beginning from the image frame that is bookmarked.

14. The computer system of claim 13, wherein in the method the analyzing the telemetry data includes:
extracting a plurality of features in the telemetry data related to the game play;
executing an AI model using the plurality of features to classify the event,
wherein the plurality of features is provided as input to the AI model configured to identify one or more events within the game play,
wherein the AI model identifies the one or more image frames of the event,
wherein the AI model generates the information of the event.

15. The computer system of claim 13, the method further comprising:
for a corresponding bookmark of the one or more bookmarks being displayed, displaying a corresponding description of a corresponding event; and
displaying a corresponding thumbnail of a representative image frame of the corresponding event,
wherein information for the corresponding bookmark includes a corresponding pointer that references placement of one or more image frames of the corresponding event in the buffer.

16. The computer system of claim 13, wherein in the method the displaying the one or more image frames of the event includes:
entering a rewind mode by automatically switching from displaying the game play that is live to displaying the one or more image frames of the event; and
responding to one or more rewind controller inputs configured for controlling the displaying of the subset of the plurality of image frames including the image frames of the event in the rewind mode.

17. The computer system of claim 13, the method further comprising:
receiving a request including one or more searchable descriptors to view a described event in the game play, wherein the request includes one or more descriptors of the described event, wherein the request may be in a text format or an audio format;
comparing the descriptors of the described event to one or more events in the game play that are identified; and
aligning the event that is identified and that occurs in the subset of the plurality of image frames to the described event.

18. A method, comprising:
generating telemetry data for a plurality of image frames that is generated for a game play of a video game;
storing at least a subset of the plurality of image frames in a buffer;
analyzing the telemetry data to identify an event occurring in the subset of the plurality of image frames, wherein the event is associated with one or more image frames;
generating a bookmark for an image frame in the one or more image frames of the event, wherein the bookmark includes information of the event, wherein selection of the bookmark by a user initiates a replay of the one or more image frames of the event;
receiving a request including one or more searchable descriptors to view a described event in the game play, wherein the request includes one or more descriptors of the described event, wherein the request may be in a text format or an audio format;
comparing the descriptors of the described event to one or more events in the game play that are identified; and
aligning the event that is identified and that occurs in the subset of the plurality of image frames to the described event.

19. A non-transitory computer-readable medium storing a computer program for performing a method, the computer-readable medium comprising:
program instructions for generating telemetry data for a plurality of image frames that is generated for a game play of a video game;
program instructions for storing at least a subset of the plurality of image frames in a buffer;
program instructions for analyzing the telemetry data to identify an event occurring in the subset of the plurality of image frames, wherein the event is associated with one or more image frames;
program instructions for generating a bookmark for an image frame in the one or more image frames of the event, wherein the bookmark includes information of the event, wherein selection of the bookmark by a user initiates a replay of the one or more image frames of the event;
program instructions for receiving a request including one or more searchable descriptors to view a described event in the game play, wherein the request includes one or more descriptors of the described event, wherein the request may be in a text format or an audio format;

program instructions for comparing the descriptors of the described event to one or more events in the game play that are identified; and program instructions for aligning the event that is identified and that occurs in the subset of the plurality of image frames to the described event.

20. A computer system comprising:

a processor;

memory coupled to the processor and having stored therein instructions that, if executed by the computer system, cause the computer system to execute a method, comprising:

generating telemetry data for a plurality of image frames that is generated for a game play of a video game;

storing at least a subset of the plurality of image frames in a buffer;

analyzing the telemetry data to identify an event occurring in the subset of the plurality of image frames, wherein the event is associated with one or more image frames;

generating a bookmark for an image frame in the one or more image frames of the event, wherein the bookmark includes information of the event, wherein selection of the bookmark by a user initiates a replay of the one or more image frames of the event;

receiving a request including one or more searchable descriptors to view a described event in the game play, wherein the request includes one or more descriptors of the described event, wherein the request may be in a text format or an audio format;

comparing the descriptors of the described event to one or more events in the game play that are identified; and aligning the event that is identified and that occurs in the subset of the plurality of image frames to the described event.

* * * * *